(12) United States Patent
Mango

(10) Patent No.: US 10,610,849 B2
(45) Date of Patent: Apr. 7, 2020

(54) GENERATOR DEVICE OF COLD PLASMA AND RELATED METHOD FOR PRODUCING CHEMICAL SUBSTANCES

(71) Applicant: Amlika Mercantile Private Limited, Mumbai, Maharashtra (IN)

(72) Inventor: Aldo Mango, Rocca d'Evandro (IT)

(73) Assignee: Amlika Mercantile Private Limited, Mumbai, Maharashtra (IN)

( * ) Notice: Subject to any disclaimer, the term of this patent is extended or adjusted under 35 U.S.C. 154(b) by 219 days.

(21) Appl. No.: 14/782,734

(22) PCT Filed: Apr. 10, 2014

(86) PCT No.: PCT/IB2014/060609
§ 371 (c)(1),
(2) Date: Oct. 6, 2015

(87) PCT Pub. No.: WO2014/167520
PCT Pub. Date: Oct. 16, 2014

(65) Prior Publication Data
US 2016/0030912 A1    Feb. 4, 2016

(30) Foreign Application Priority Data

Apr. 10, 2013  (IT) .............................. RM2013A0212
Apr. 10, 2013  (IT) .............................. RM2013A0214
(Continued)

(51) Int. Cl.
*B01J 19/08*      (2006.01)
*H05H 1/48*       (2006.01)

(52) U.S. Cl.
CPC .............. *B01J 19/088* (2013.01); *H05H 1/48* (2013.01); *B01J 2219/0809* (2013.01);
(Continued)

(58) Field of Classification Search
CPC .............. B01J 19/088; B01J 2219/0809; B01J 2219/0837; B01J 2219/0869;
(Continued)

(56) References Cited

U.S. PATENT DOCUMENTS 3,899,685 A    8/1975  Francis et al.
5,387,775 A    2/1995  Kang
(Continued)

FOREIGN PATENT DOCUMENTS

EP    1297891 A1    4/2003
FR    2763778 A1    11/1998
FR    2775864 A1    9/1999

*Primary Examiner* — Xiuyu Tai
(74) *Attorney, Agent, or Firm* — Bret E. Field; Bozicevic, Field & Francis LLP

(57) ABSTRACT

The present invention relates to a device for generating cold plasma to be used in the process chemical industry, in particular for producing chemical substances, above all acids such as for example nitric acid and sulphuric acid. The invention also relates to reactors and plants involving said cold plasma generator device and to corresponding chemical processes based thereupon. The device and the associated method of the present invention allow producing with high efficiency several chemical substances, in particular acids. The invention also keeps the several advantages of using the cold plasma technology, in particular the one of not requiring catalysts and/or high reaction temperatures.

19 Claims, 16 Drawing Sheets

(30) Foreign Application Priority Data

| | | |
|---|---|---|
| Apr. 10, 2013 | (IT) | RM2013A0215 |
| Apr. 10, 2013 | (IT) | RM2013A0216 |
| Jun. 27, 2013 | (IT) | RM2013A0374 |

(52) U.S. Cl.
CPC ...... *B01J 2219/0837* (2013.01); *B01J 2219/0869* (2013.01); *B01J 2219/0875* (2013.01); *B01J 2219/0894* (2013.01); *H05H 2001/485* (2013.01)

(58) Field of Classification Search
CPC ........ B01J 2219/0875; B01J 2219/0894; B01J 2219/083; B01J 2219/0813; B01J 2219/0841; B01J 2219/0877; B01J 2219/0884; B01J 2219/0818; B01J 2219/0822; B01J 2219/0832; B01J 2219/0871; B01J 2219/0898; H05H 1/48; H05H 2001/485; A61L 2/00; A61L 9/00; A61L 9/22; C02F 2001/46138; C02F 2303/04; C02F 2305/023; C02F 1/4606; C02F 1/4608; C02F 9/00; C02F 1/52; C02F 1/001; C02F 1/008; C02F 1/283; C02F 1/42; C02F 1/5236; C02F 1/74; C02F 1/78; C02F 2103/42; C02F 2209/03; C02F 2209/40; C02F 1/28; C02F 1/46; C05F 3/00; C05F 3/06; C05F 7/00; C05F 11/00; C05F 11/02; C01B 3/22; C01B 2203/0266; C01B 2203/0861; C01B 13/11; C01B 13/115; C01B 2201/22; C01B 2201/82; C10G 15/08; C10L 3/00; Y02P 20/145; Y02A 40/205; Y02A 40/208; Y02E 50/343

See application file for complete search history.

(56) References Cited

U.S. PATENT DOCUMENTS

| | | | |
|---|---|---|---|
| 6,540,966 B1 * | 4/2003 | Santilli | B01J 19/088 |
| | | | 204/164 |
| 2004/0084382 A1 * | 5/2004 | Ryazanova | C01B 13/11 |
| | | | 210/748.11 |
| 2007/0267289 A1 | 11/2007 | Jabs et al. | |
| 2012/0261391 A1 | 10/2012 | Ihde et al. | |

* cited by examiner

GENERATOR DEVICE OF COLD PLASMA AND RELATED METHOD FOR PRODUCING CHEMICAL SUBSTANCES

FIELD OF THE INVENTION

The present invention relates to a device for generating cold plasma to be used in the process chemical industry, in particular for producing chemical substances, above all acids such as for example nitric acid and sulphuric acid.

The invention also relates to reactors and plants including said cold plasma generator device and to corresponding chemical processes based thereupon.

BACKGROUND

The use of cold plasma for producing chemical substances has different advantages with respect to the traditional methods. In particular, in case of the production of nitric acid according to the reaction:

$$2N_2 + 5O_2 + 2H_2O \rightarrow 4HNO_3$$

it is not necessary using catalysts, nor working at high temperatures and above all as raw material Ammonia is not used, but only simple ambient air or air enriched with oxygen with various techniques, such as the molecular sieves or cryoseparation or others, is used.

The known cold plasma generators are mainly constituted by two electrodes fed by a high tension or frequency electric generator, so that an electrical field is generated between the same electrodes. The field, in turn, ionizes and excites the gas molecules or atoms—typically air—existing between the electrodes, thus generating a plasma gas.

However, the plasma generators known in the art and the reactors in which they are inserted have some important limits. Such limits are mainly linked to the efficiency of the system for generating plasma which, due to its intrinsic nature, takes place in a very restricted region between the electrodes.

The just illustrated aspects strongly contain the use of the cold plasma technology in the chemical synthesis processes.

SUMMARY OF THE INVENTION

The technical problem placed and solved by the present invention is then to provide a device for generating cold plasma and a related method or process for producing a chemical substance allowing to obviate the drawbacks mentioned above with reference to the known art.

The invention also provides a reactor and a chemical plant incorporating said generator device.

The above-mentioned technical problem is solved as illustrated in the independent claim 1.

Preferred features of the present invention are subject of the depending claims.

The device and the associated method of the present invention allow producing with high efficiency several chemical substances, in particular acids. The invention also keeps many advantages of using the cold plasma technology, in particular that of not requiring catalysts and/or high reaction temperatures.

The device and the method of the invention also allow low costs of implementation and operation.

The device and the method of the invention are particularly advantageous in the application for producing nitric acid and sulphuric acid.

Other advantages, features and use modes of the present invention will result evident from the following detailed description of some embodiments, shown by way of example and not with limitative purpose.

The invention provides a cold plasma generator device, suitable for use in a process, in particular for producing nitric or sulphuric acid, which device comprises:
- an outer electrode and an inner electrode, arranged one surrounding the other one so as to define between them a plasma generation region,
- wherein said inner and/or outer electrodes are connected or connectable to a power source so that, in use, a difference in electric potential is established at said plasma generation region,
- wherein the inner and outer electrodes are rotatable one with respect to the other,
- wherein said outer electrode has an inlet port for a gas which has to cross said plasma generation region and at least a recirculating outlet port of plasma gas which has crossed said plasma generation region;
- triggering means for triggering a discharge between said outer and inner electrode, said triggering means being connected, preferably fixed, to a revolving electrode, of said two electrodes; and
- gas intaking means, apt to draw gas through said plasma generation region, said gas intaking means being connected, preferably fixed, to a revolving electrode of said two electrodes.

Preferably, the inner electrode or both electrodes are rotatable.

In an embodiment example, the outer and inner electrodes are arranged so that the respective longitudinal axes are substantially parallel or coincident, the common direction of said axes preferably corresponding also to that of an axis of relative rotation.

The outer and inner electrodes can be arranged coaxially or eccentrically.

The outer and inner electrodes can have a substantially cylindrical geometry.

Preferably, the inner electrode is shaft-shaped.

In an advantageous configuration, the device comprises an intermediate support of the inner electrode, which is apt to guarantee the electrical insulation between said two electrodes.

Preferably, the cross section area of said outer electrode is about 25 to 100 times greater than the cross section of said inner electrode.

Preferably, said outer and inner electrodes, one or both of them, have a substantially circular section. In the latter case, preferably the diameter of said outer electrode is about 5 to 10 times greater than the diameter of said inner electrode. Still in case of circular section of the inner electrode, this has a diameter comprised in a range of about 20-200 mm.

Preferably, said outer electrode and/or said inner electrode have a length equal to, or greater than, about 200 mm.

In an advantageous configuration, said gas inlet port is arranged at an end, preferably at a base, of said outer electrode.

Furthermore, preferably said at least a recirculating outlet port is arranged at a lateral wall or skirt of said outer electrode. Advantageously, said at least a recirculating outlet port defines an outlet area substantially equal to, or greater than, the area of a cross section of said outer electrode.

In a preferred configuration, the outer electrode has a plurality of recirculation outlet ports for the plasma gas, which ports are preferably arranged in a lateral wall or skirt of said outer electrode.

Preferably, said outer electrode has an additional outlet port of plasma gas, arranged downstream of at least one outlet recirculating port with respect to the flow of plasma gas. Preferably, said additional port is arranged at a lateral wall or skirt of said outer electrode.

In a preferred configuration, said triggering means are fixed to a revolving electrode of said electrodes.

Preferably, said triggering means is based upon the point effect.

Advantageously, the triggering means is substantially comb-shaped

Preferably, said gas intaking means comprises a rotor or impeller which is fixed to a revolving electrode of said inner and outer electrodes, wherein said rotor or impeller is preferably made at least partially of a plastic material.

Advantageously, said gas intaking means comprises a rotor or impeller fixed to said inner electrode, wherein the rotor or impeller preferably has a diameter comprised in a range of about 70-95%, more preferably of about 60-90%, of an internal diameter of said outer electrode.

The invention also provides a cold plasma generator device, suitable for use in a process, in particular for producing nitric or sulphuric acid, which device comprises a first electrode and a second electrode, arranged so as to define between them a plasma generation region, which first and/or second electrode are connected or connectable to a power source so that, in use, a difference in electric potential is established at said plasma generation region, which device has an inlet port for a gas which has to cross said plasma generation region and at least a recirculation port for the plasma gas which has crossed said plasma generation region, the device being configured so that said second electrode is a liquid electrode.

Preferably, the device comprises a main body, said first electrode being at least partially received within said main body.

In an advantageous configuration, said inlet port and/or said at least a recirculating outlet port are obtained on said main body.

Preferably, said inlet port or said at least a recirculating outlet port are arranged at an end, preferably at a base, of said main body. Preferably, said at least a recirculating outlet port and said inlet port are arranged at a lateral wall or skirt of said main body.

Advantageously, said at least a recirculating outlet port defines an outlet area substantially equal to, or greater than, the cross section area of said main body.

The main body can have a plurality of recirculation outlet ports for the plasma gas, which ports are preferably arranged at a lateral wall or skirt of said main body.

In a preferred configuration, said main body and said first electrode are arranged so that respective longitudinal axes are substantially parallel or coincident, wherein preferably the common direction of said axes also corresponds to that of an axis of rotation of said first electrode.

The main body and the first electrode can be arranged coaxially or eccentrically.

The main body and/or said first electrode can have a substantially cylindrical geometry.

Preferably, the cross section area of said main body is about 25 to 100 times greater than the cross section of said first electrode.

Preferably, said main body and said first electrode, one or both of them, have a substantially circular section. In the latter case, preferably the diameter of said main body is about 5 to 10 times greater than the diameter of said electrode.

The main body preferably has at least a liquid-inlet port, preferably arranged at a side wall or skirt thereof, the arrangement being such that said liquid-inlet port allows said main body to be partially immersed into the liquid electrode.

Advantageously, the liquid-inlet port and said at least a recirculating outlet port are arranged at respective portions of said main body substantially orthogonal one to the other one.

Preferably, the first electrode is rotatable and advantageously shaft-shaped. In a preferred configuration, the first electrode is fixed onto a rotatable shaft, the latter preferably receive within said main body.

Preferably, the first electrode is arranged substantially parallel to a free surface of said liquid electrode.

The device can comprise gas intaking means, apt to draw gas through said plasma generation region. Advantageously, it comprises a rotor or impeller, the latter being preferably connected, more preferably fixed, to said first revolving electrode, wherein said rotor or impeller is preferably made at least partially of a plastic material.

The gas intaking means can comprise a rotor or impeller, preferably a centrifugal rotor or impeller, arranged outside said main body.

The gas intaking means can comprise a rotor or impeller which has a diameter comprised in a range of about 70-95%, more preferably of about 60-90%, of an internal diameter of said main body.

The device preferably comprises sliding electrical contact means associated to said first electrode.

Also this device comprises triggering means for triggering a discharge between said first and second electrode, preferably connected or fixed to said first electrode.

The triggering means can be based upon the point effect and are preferably substantially comp-shaped.

The invention also provides a generator assembly, comprising a generator device as sofar described and a high frequency or tension electric generator connected or connectable to one or both electrodes.

Preferably, the assembly further comprises a motor apt to drive the rotation of one of said electrodes of said generator device, preferably at a maximal speed of about 2800 revolutions per minute.

The invention also provides a reactor apparatus suitable for use in a process, in particular for producing nitric or sulphuric acid, which apparatus comprises at least a generator device or generator assembly as defined above depending upon the presence of an inner and outer electrode, said apparatus having a tank region apt to receive a conductive liquid, the arrangement being such that one of said inner and outer electrodes of said generator device is at least partially received in said tank region, and, in use, immersed in the conductive liquid, and wherein the apparatus has at least an outlet port for outputting gas/vapour obtained in said reactor apparatus by a reaction involving the plasma gas generated in said at least a generator device.

The invention also provides a reactor apparatus, suitable for use in a process, in particular for producing nitric or sulphuric acid, which apparatus comprises at least a generator device or generator assembly as defined above depending upon the provision of a liquid electrode, and wherein the device has at least an outlet port for outputting a gas/vapour obtained in said reactor apparatus by a reaction involving the plasma gas generated in said at least a generator device. Preferably, even such apparatus with liquid electrode has a tank region apt to receive the liquid electrode.

Preferably, the reactor apparatus comprises an external casing, said at least a generator device being at least partially arranged inside said casing. Advantageously, the casing defines said tank region, the latter being preferably substantially bulb- or basin-shaped. Preferably, said casing has a conductive liquid inlet and a gas inlet, arranged at opposite sides or the one adjacent to the other one.

In the version with liquid electrode, said casing has an outlet of the gas/vapour, preferably arranged at a top portion thereof.

In a particularly advantageous configuration, said inner electrode is arranged so that, in use, it is at least partially immersed in the conductive liquid received in said tank region.

Preferably, said at least a generator device is arranged so that a longitudinal axis thereof, preferably a longitudinal axis of said inner electrode, is substantially perpendicular to the free surface of said conductive liquid.

Advantageously, the apparatus comprises means for controlling and/or adjusting the level of said conductive liquid/liquid electrode inside said tank region.

The generator device can be arranged so that a longitudinal axis of said inner electrode is substantially vertical or that a longitudinal axis of said first electrode is substantially horizontal.

The apparatus preferably comprises a plurality of generator devices and/or generator assemblies each one as defined above.

The invention also provides a chemical plant comprising:
a reactor apparatus or a generator device as defined above, and
a condenser, operatively connected to said reactor apparatus or to said generator device to receive as an input the gas/vapour outputted therefrom.

Preferably, the plant further comprises a liquid-gas separator, arranged downstream of said condenser.

Advantageously, at least a cooling device is provided, arranged downstream of said condenser, which cooling device preferably comprises a fog reactor.

In an advantageous configuration, the plant further comprises at least a contact reactor arranged downstream of said condenser and preferably downstream of said at least a cooling device. Preferably, the contact reactor comprises recirculation means of the condensed product.

The plant can further comprise connection means between said contact reactor and said reactor apparatus apt to adduct a gas from the contact reactor in the reactor apparatus.

Preferably, said cooling device and/or said contact reactor (s) comprise nebulisation means of a condensed product received in said device(s).

The plant can also comprise at least a sulphur burner, apt to produce sulphur fumes and arranged upstream of said reactor apparatus.

At least a cooling device can be provided, arranged downstream of said burner(s) and upstream of said reactor apparatus.

Preferably, the herein considered chemical plant is a plant for producing nitric or sulphuric acid.

The invention further provides a chemical process for producing a chemical substance, in particular an acid, in particular nitric or sulphuric acid, which preferably utilizes a generator device, a generator assembly, a reactor apparatus or a plant as defined above.

The invention also provides a chemical process for producing a chemical substance, in particular an acid, in a reactor apparatus by means of cold plasma, wherein said cold plasma is generated in a generator device of said reactor apparatus which comprises an outer electrode and an inner electrode arranged one surrounding the other so as to define between them a plasma generation region, which inner and/or outer electrodes are fed by a power source so that a difference in electric potential is established between them at said plasma generation region, wherein said inner and outer electrode rotate one with respect to the other one, wherein a gas is made to cross said plasma generation region so as to obtain a plasma gas, wherein a portion of said plasma gas which has crossed said plasma generation region is recirculated in said plasma generation region.

The invention also provides a chemical process for producing a chemical substance, in particular an acid, in a reactor apparatus by means of cold plasma, wherein said cold plasma is generated in a generator device of said reactor apparatus which comprises a first electrode and a second electrode arranged one with respect to the other one so as to define between them a plasma generation region, which first and/or second electrode are fed by a power source so that a difference in electric potential is established between them at said plasma generation region, wherein a gas is made to cross said plasma generation region so as to obtain a plasma gas, wherein said second electrode is a liquid electrode. Also in this case, preferably the plasma gas which has crossed said plasma generation region is recirculated into said plasma generation region.

Preferably, the inner electrode—or the first electrode—is rotatable and the outer electrode is fixed. Alternatively, in the variant with electrodes one surrounding the other one such electrodes are rotatable. Preferably, a maximal rotational speed of about 2800 revolutions per minute is provided.

Advantageously, the outer and inner electrodes are arranged so that the respective longitudinal axes are substantially parallel or coincident, the common direction of said axes preferably corresponding also to that of an axis of relative rotation.

The outer and inner electrodes can be arranged coaxially or eccentrically.

The generator device can be arranged with a longitudinal axis of said inner electrode substantially vertical or with a longitudinal axis of said first electrode substantially horizontal.

Advantageously, the recirculated portion of said plasma gas is in a ratio comprised in a range 1:10 up to 10:1 with respect to the plasma gas which leaves the generator device or the acid which leaves the reactor apparatus towards further steps of the process.

In a preferred configuration, one of said inner and outer electrodes is at least partially immersed in a conductive liquid. Preferably, a longitudinal axis of said inner electrode is substantially perpendicular to the free surface of said conductive liquid. In the variant with liquid electrode, preferably a longitudinal axis of said first electrode is substantially parallel to the free surface of said liquid electrode.

In the variant with liquid electrode, preferably a main body is provided which encloses said first electrode and which is at least partially immersed in said liquid electrode.

Still in the variant with liquid electrode, advantageously the distance between said first and second electrode is adjusted by controlling the level of said liquid electrode.

Preferably, to cool down the gas entering said plasma generation region a conductive liquid or the liquid electrode is used, preferably generating the vapour which enters said plasma generation region.

The process can comprise a condensing step for the acid and gas/vapour generated in said reactor apparatus.

The process can also comprise a liquid-gas separation step downstream of said condensing step.

Advantageously, at least a cooling step downstream of said condensing step is provided, preferably a fog-cooling step.

The process can provide a further reaction step apt to increase the acid production, provided downstream of said condensing step and preferably downstream of said at least a cooling step. Such additional reaction step can provide an increase in the contact surface between the condensed acid and vapours, preferably by using nebulisation or spraying means, and in case a recirculation of condensed acid. A recirculation of gas from said additional reaction step to said generator device can also be provided.

In a preferred embodiment, said acid is H2SO4 and the process comprises a step for producing sulphur fumes, the latter being the input gas crossing said plasma generation region. The process can further provide at least a cooling step of said sulphur fumes before their inletting into said plasma generation region.

In another preferred embodiment, said acid is nitric acid and the input gas crossing said plasma generation region is air.

The reactor and the associated method of the present invention allow producing with high efficiency several chemical substances. The invention is particularly advantageous for producing nitric acid, sulphuric acid, NO, $NO_2$, $NO_x$, $N_xO_x$ and advanced oxidation products, Volatile Organic Compounds (VOCs), such as for example the oxidation of hydrocarbons in water and carbon dioxide.

According to an embodiment the present invention relates to atmospheric cold plasma apparatuses and processes for producing nitric acid, sulphuric acid, ammonium nitrate, ammonium sulphate, calcium nitrate or ammonium nitrate.

BRIEF DESCRIPTION OF THE FIGURES

The figures of the enclosed drawings will be referred to, wherein.

DETAILED DESCRIPTION OF PREFERRED EMBODIMENTS

Various embodiments and variants of the generator device, of the reactor, of the plant and of the method or processes of the invention will be described hereinafter, and this with reference to the above mentioned figures.

Analogous components are designated in the different figures with the same reference numbers.

In the following detailed description, additional embodiments and variants with respect to embodiments and variants already discussed in the same description will be illustrated limited to the difference with respect to what already illustrated.

Furthermore, the different embodiments and variants described hereinafter are subjected to be used in combination, where compatible.

Figure 1:
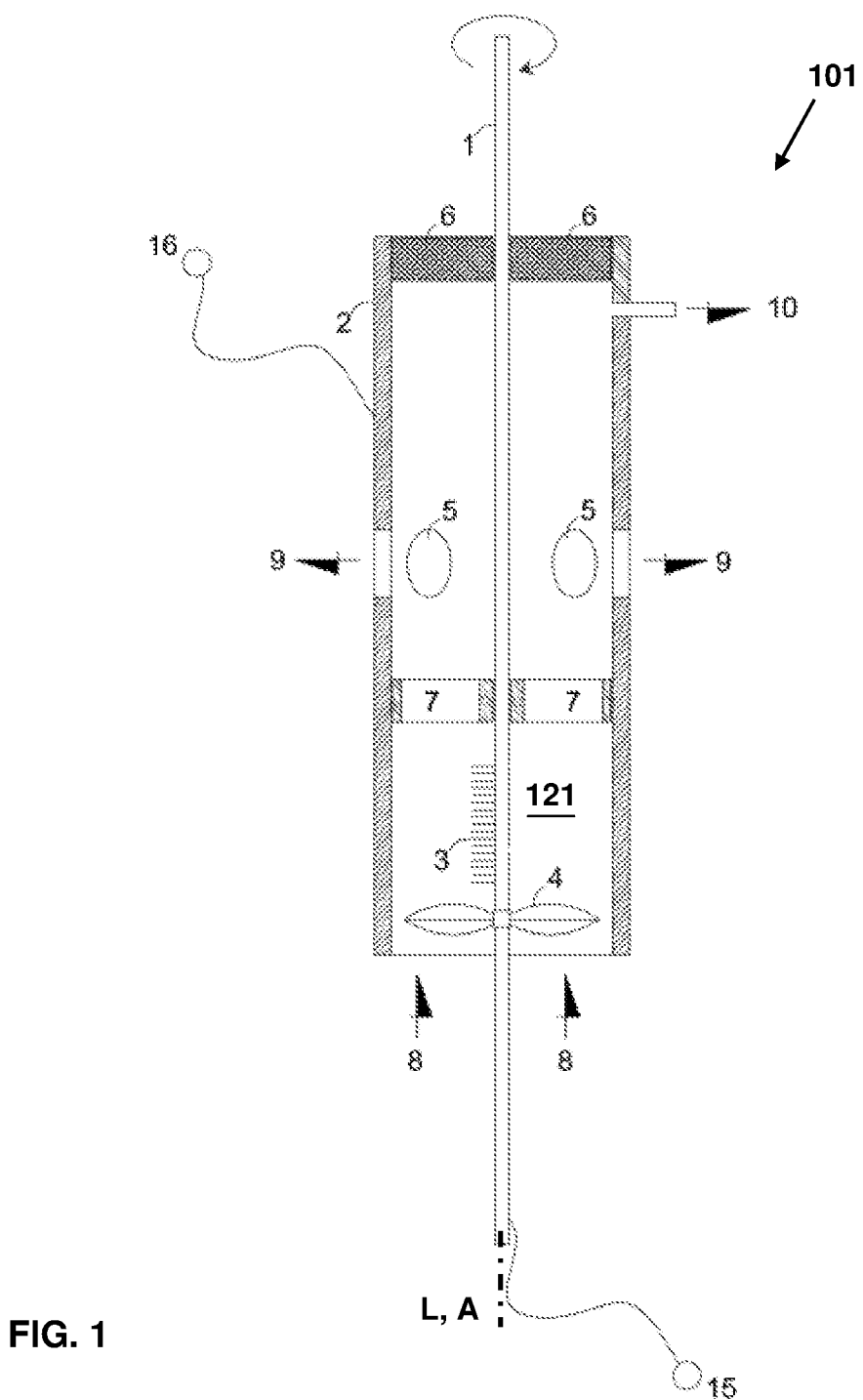
FIG. 1 shows a schematic view in longitudinal section of a cold plasma generator device according to a first embodiment of the present invention.

By firstly referring to FIG. 1, a cold plasma generator device according to a first preferred embodiment of the invention is designated as a whole with 101. The device 101 is suitable to be used in the process chemical industry, in particular in a chemical plant for producing nitric or sulphuric acid.

The device 101 comprises an inner electrode 1 and an outer electrode 2, arranged so that the second one surrounds the first one.

In the present example, the inner electrode 1 is substantially shaft-shaped, in particular having a longitudinal axis L and preferably cylindrical geometry. The inner electrode 1 for example can be implemented with tubular shape, or obtained from a lathe-machined solid cylindrical bar.

The inner electrode 1 is rotatable around an axis of rotation A, which in the present example coincides with the longitudinal axis L.

Still in the present example, the outer electrode 2 is arranged coaxially to the inner electrode 1, with a longitudinal axis thereof coincident with the longitudinal axis L of the electrode 1 itself.

The outer electrode 2 has a substantially tubular structure, preferably with cylindrical geometry.

The electrodes 1 and 2 then result to be substantially centered according to such common longitudinal axis L.

The overall arrangement is so that between the two electrodes 1 and 2 a region 121 remains defined, which for reasons which will be explained hereinafter will be defined as plasma generation. In the present example, such region 121 has a substantially toric shape.

Preferably, the electrodes 1 and 2 are made of metal. The choice of the specific metallic material depends upon the reactions which are wanted to be triggered.

In a preferred configuration, the useful (inner) cross section area of the outer electrode 2 is about 25 to 100 times greater than the cross section area of the inner electrode 1. In particular, since in the present example the inner electrode 1 and the outer one 2 have both circular or substantially circular cross section, the (maximum) diameter of the inner electrode 1 and the (minimum) diameter of the outer electrode 2 preferably are in a ratio comprised between about 1/10 and about 1/5.

Preferably, the diameter of the inner electrode 1 is comprised in a range of about 20-200 mm.

Preferably, the inner electrode 1 and/or the outer one 2 have a length starting from 200 mm and as far as few meters.

In general, as it will be better comprised based upon the following description, the specific sizes of the electrodes 1 and 2 and the related proportions depend upon the power of the generator device 101 and upon the features of the flow of gas to be treated in the region 121.

Based upon an embodiment variant, (also) the outer electrode 2 can be rotatable. In case of rotation of both electrodes 1 and 2, they preferably will move around a same axis, in opposite direction.

Preferably, the outer electrode 2 is closed on the top by an element 6, allowing the passage of the electrode 1 and which is electrically insulating.

In a specific embodiment example, the closing element 6 is a airtight lid, fixed on the outer electrode 2 with gaskets, flanges or other mechanical system.

Furthermore, in the present example the device 101 provides an intermediate support 7, interposed between the inner electrode 1 and the outer electrode 2. Such support 7 guarantees indeed a centering and a support for the inner electrode 1 and an electric insulation between the electrodes 1 and 2.

In a specific embodiment example, the intermediate support 7 is fixed on the outer electrode 2 with hidden screws or other mechanical system.

Preferably, the closing element 6 and/or the intermediate support 7 are made of plastic material. The choice of the specific plastic material depends upon the reactions which are wanted to be triggered, upon the process temperatures and upon the value of the electric voltage applied between the two electrodes, thereabout it will be spoken shortly.

In order to allow the rotation of the inner electrode 1, both the closing element 6 and the intermediate support 7 can have, at one its own seat allowing the passage of the electrode 1 itself, one or more bearings, for example a bearing made of plastic material or a bushing made of special polymer with very low friction coefficient.

The electrodes 1 and 2 are connected or connectable to a high-voltage or frequency electric source, suitable to bring them at different voltages. In FIG. 1 such source has been generically represented by means of two terminals 15 and 16, respectively connected to the inner electrode 1 and to the outer electrode 2.

The device 1 further comprises triggering means of a discharge between the two electrodes 1 and 2, arranged at the plasma generation region 121. In the present example, the triggering means is integral to the inner rotating electrode 1. Still in the present example, the triggering means is based upon the point effect and it comprises in particular an element 3 substantially shaped like a comb.

Preferably, the comb-shaped element 3 is made of metallic material. The choice of the specific metallic material depends upon the reactions which are wanted to be triggered.

In a specific embodiment example, the comb-shaped element 3 is constituted by single metallic blocks obtained from pre-constituted wire or comb. In such example:

the height of the comb teeth can vary from 1 mm up to about 100 mm, the thickness of the single teeth can vary from 1 mm up to about 5 mm, the inter-axis of the teeth can vary from 1 mm up to about 10 mm, and/or the total length of the comb can vary from 10 mm up to about few meters.

Figure 2:
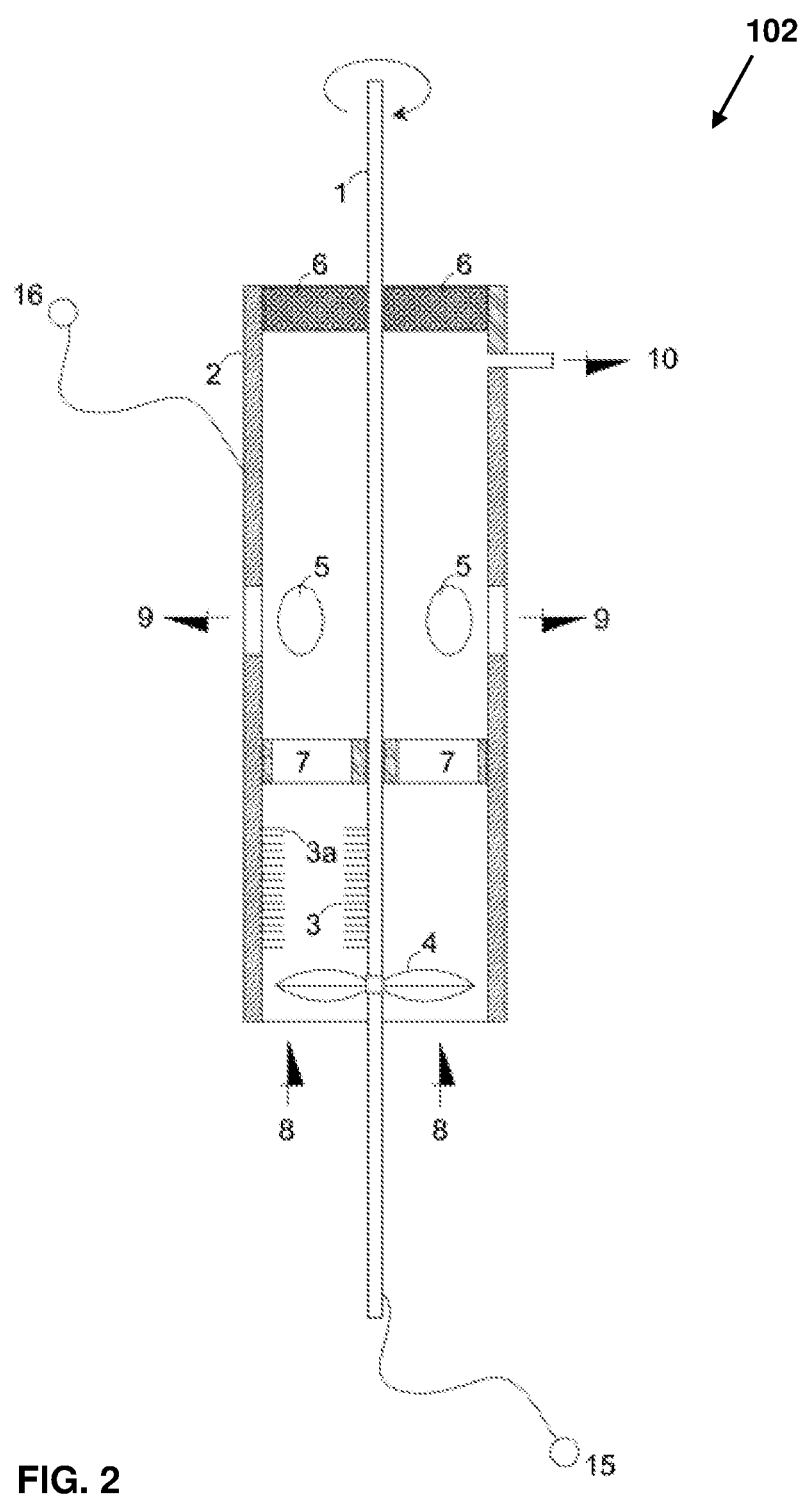
FIG. 2 shows a schematic view in longitudinal section of an embodiment variant of the device of FIG. 1.

In the variant of FIG. 2, the triggering means also comprises an additional triggering element, designated with 3a and preferably with comb-shaped structure analogous to the already described one. Even the element 3a is arranged at the region 121. The element 3a is integral to the outer electrode 2 so as to result (periodically) to be faced onto the above-mentioned first element 3.

In such variant, the generator device is designated as a whole with 102.

Thanks to the described arrangement, between the two electrodes 1 and 2 an electric field is generated which ionizes and excites the particles of the gas existing or passing in the plasma generation region 121, by allowing to obtain, outletting from the region 121, a plasma gas.

The device 101 further comprises gas intaking means, in particular air, within the plasma generation region 121. In the present example, such intaking means comprises a rotor or impeller 4, revolving integrally to the inner electrode 1 and mounted thereon upstream of the gas flow with respect to the region 121. The impeller 4 then, in the present example, is an axial impeller. The impeller 4 is arranged near a gas inlet 8 thereabout it will be discussed shortly.

Preferably, the impeller 4 is made at least partially of plastic material. The choice of the plastic material depends upon the reactions which are wanted to be triggered and by the process temperatures.

Preferably, the impeller 4 has a diameter comprised in a range of about 70%-95%, more preferably about 60%-90%, of the inner diameter of the outer electrode 2.

The outer electrode 2 has the already mentioned gas inlet 8, in particular arranged at one its own base, upstream of the plasma generation region 121 with respect to the gas flow as adducted indeed as inlet by the impeller 4. The gas inlet 8 defines the sucking section of the impeller 4.

The outer electrode 2 has also a plurality of outlet ports for the gas recirculation, designated with 5 and the function thereof will be explained hereinafter. Preferably, the ports 5 are arranged at a side wall, the side skirt in the present example, of the electrode 2. The ports 5 are arranged downstream of the plasma generation region 121 still with respect to the flow of inlet gas, so that therethrough a portion of the plasma gas which has formed in such region 121 outgoes. The reference number 9 indeed designates the direction of the flow of plasma gas outletting from the ports 5.

Still based upon a preferred embodiment, the gas outletting area defined by the recirculation ports 5 is substantially equal to or greater than the useful (inner) cross section area of the outer electrode 2.

Preferably, each one of the recirculation ports 5 has a substantially circular profile.

Preferably, the distance between an average point of the recirculation ports 5 and the closing element 6—or generally the upper margin of the outer electrode 2—can vary between about 50 mm and 500 mm, independently from the length of the electrode 2 itself.

Embodiment variants can provide one single recirculation port 5.

The outer electrode 2 then has an additional port for outletting gas, designated with 10, arrange downstream of the recirculation ports 5.

As it will be better explained hereinafter, from the outletting port 10 the plasma gas outgoes, useful in the implemented chemical process.

The quantity of plasma gas outletting from the port 10 with respect to the one recirculated through the ports 5 is linked to the overpressure which generates within the device 101, and more in general within the reactor incorporating it.

The generator device 101 can also be provided as portion of an assembly comprising the above-mentioned energy source or generator 15, 16 connected or connectable to the two electrodes 1 and 2.

Furthermore, such assembly can comprise even a motor or other driving means of the inner electrode 1 and/or of the impeller 4, preferably suitable to produce a rotation of the latter of about 2800 revolutions/minute. The choice of the rotation speed depends upon the size of the generator device 101 and upon the applied voltages and frequencies.

Figure 3:
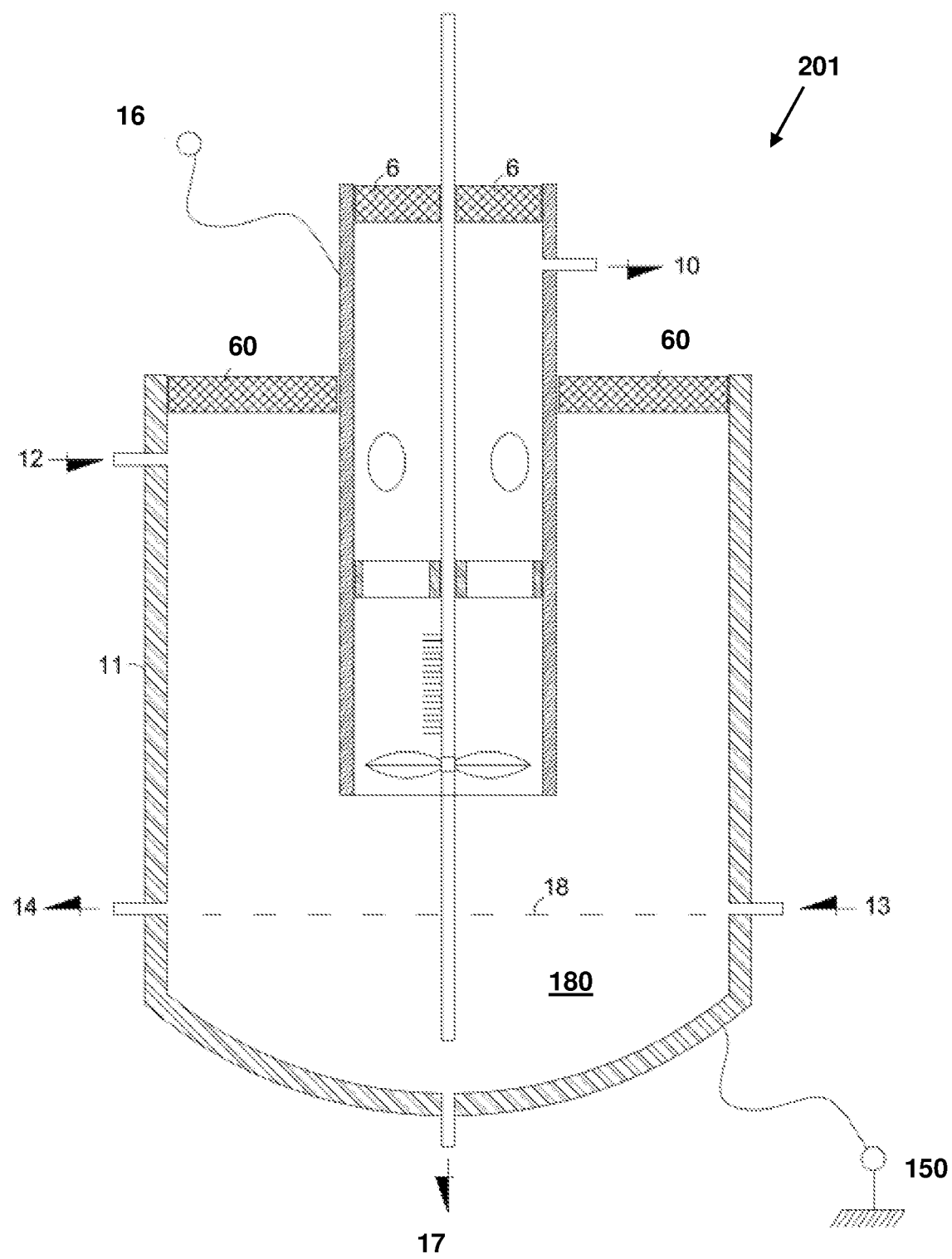
FIG. 3 shows a schematic view in longitudinal section of a reactor incorporating the device of FIG. 1.

By now referring to FIG. 3, the generator device 101 described above is shown as portion of a reactor 201.

The reactor 201 has an external casing, or case, 11 defining a tank region 180, which receives, in use, a conductive liquid, preferably water. The free surface of the latter is designated with 18. Preferably, the casing 11 has an upper portion with substantially cylindrical geometry and a lower portion, corresponding to the region 180, substantially shaped like a basin or bulb.

At the casing 11, and in particular of the tank region thereof 180, an inlet 13 for the liquid and an outlet 14 still for the liquid are obtained. Preferably, such inlet and outlet 13 and 14 are arranged at the side skirt of the casing 11.

Furthermore, a lower liquid outlet 17 is provided, to empty the reactor 201 at the end of the operation or for maintenance.

Preferably, automatic or manual means for adjusting the level of the conductive liquid in the tank region 180 is provided.

The casing 11 furthermore has an inlet 12 for the gas, typically air. In the herein considered arrangement, the air inlet 12 of the reactor 201 is obtained on the opposite side with respect to the liquid inlet 13, still at the side skirt of the casing 11.

In the considered example an upper closing element 60 for the casing 11 is provided, substantially analogous to the closing element 6 already described with reference to the generator device 101.

The generator device 101 is at least partially received within the casing 11 of the reactor 201. In the herein considered arrangement, the outlet of plasma gas 10 of the device 101 is arranged outside the casing 11, whereas the recirculation outlets 5 are arranged within the latter, indeed to obtain a gas recirculation within the casing 11.

Still in the present example, the casing 11 and the generator device 101 are arranged substantially coaxial along the axis L of the device 101, which axis in the present example is vertical or substantially vertical. The inner electrode 1 results then to be substantially orthogonal to the free surface 18 of the conductive liquid.

The overall arrangement is so that, in use, the lower portion of the inner electrode 1, preferably a portion extending for about half length of such electrode, is immersed in the conductive liquid.

The typical operating modes of the reactor 201 and of the generator device 101 incorporated therein are illustrated hereinafter.

With the already mentioned outer motor—or with equivalent driving means—and with suitable transmissions with high electric insulation the inner electrode 1 is put into rotation with angular speed from few revolutions per minute to 2800 revolutions per minute.

In this case only the electrode 2 is fed with high voltage and/or high frequency, whereas the casing 11 of the reactor is grounded. The inner electrode 1, in this configuration, ground discharges by means of the conductive liquid and the casing 11. In the space comprised between the points of the comb-shaped element 3 and the outer electrode 2, that is in the plasma generation region 121 illustrated above, a discharge is triggered, in particular a discharge visible thanks to the proximity between the two conductive portions and to the point effect.

The rotation of the central electrode 1 moves continuously the triggering area, by distributing it uniformly over the whole cylindrical surface of the electrodes 1 and 2 and the toric volume of the region 121.

After the triggering discharge, between the central electrode 1 and the outer one 2 a plasma cylindrical region is created even involving all length of the outer electrode 2.

The rotation of the central electrode 1 carries therewith the impeller 4 sucking gas, in particular air, from the inlet 8 and makes it to cross the plasma cylindrical region which has created. As said, a portion of the obtained plasma gas outgoes from the recirculation ports 5.

The immersion of the inner electrode 1 in the conductive liquid, apart from representing an optimum rotating or sliding electric contact, determines the cooling thereof. For this reason, a portion of the conductive liquid vaporizes and it is sucked by the impeller 4 together with the gases recirculated in the environment of the reactor 201 and with the gas inletting from the inlet 12.

The sucked gases and vapours are then subjected to a wide cold plasma region, particularly interesting for the process chemical industry.

The equilibrium between the rate of gas outgoing from the reactor through the port 10 and becomes then useful to the purpose of production of a chemical substance and the rate of gases recirculated through the ports 5 depends upon the specific operating needs and influences the overall performance of the process. Preferably, such rates are in a ratio which can vary in a range 1:1 and up to about 1:10.

Figure 4:
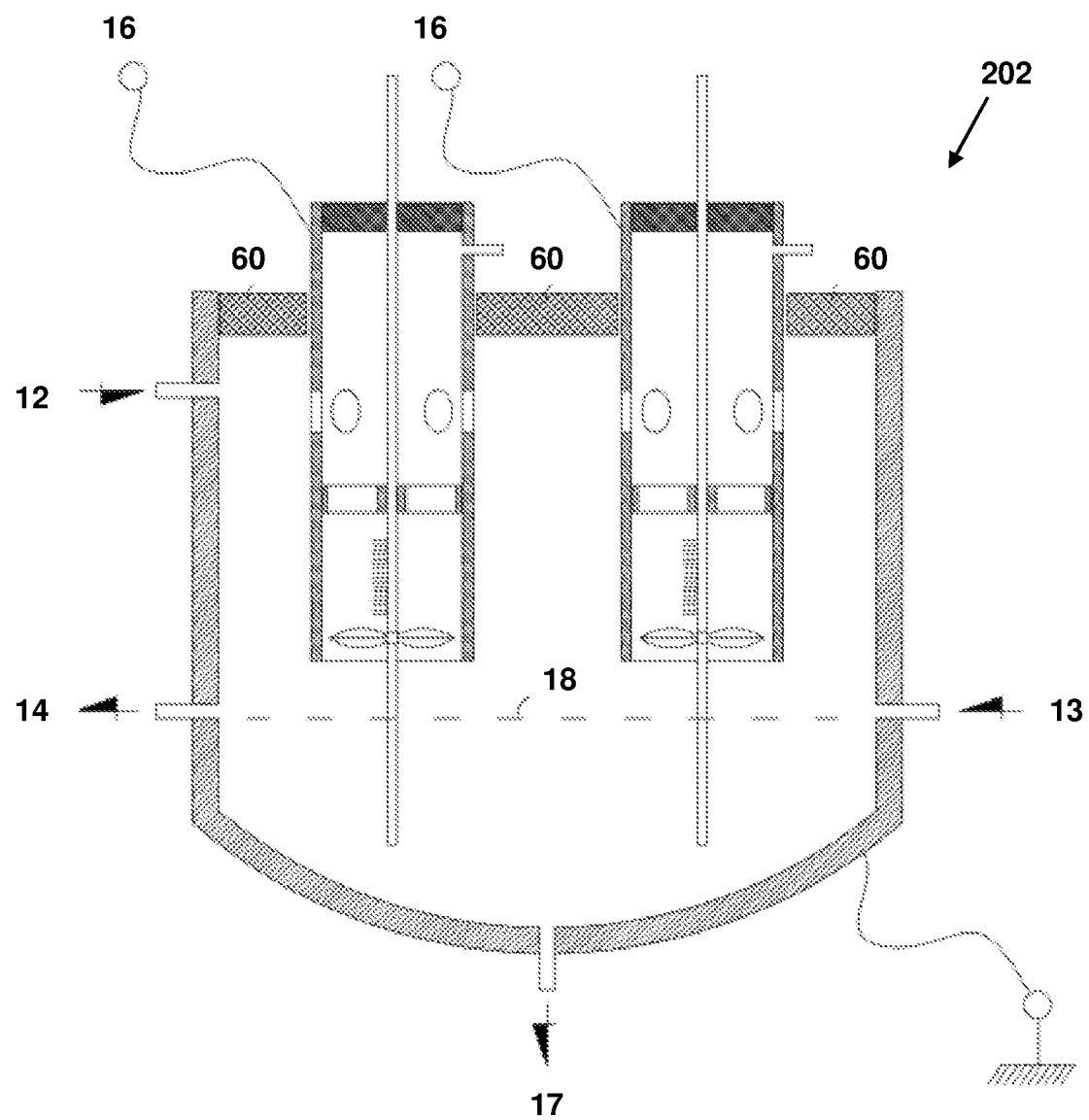
FIG. 4 shows a schematic view in longitudinal section of a reactor incorporating a pair of generator devices each one implemented according to the embodiment of FIG. 1.

FIG. 4 shows a second embodiment of reactor, designated with 202, which comprises a plurality, in particular a pair, of generator devices 101.

Figure 5:
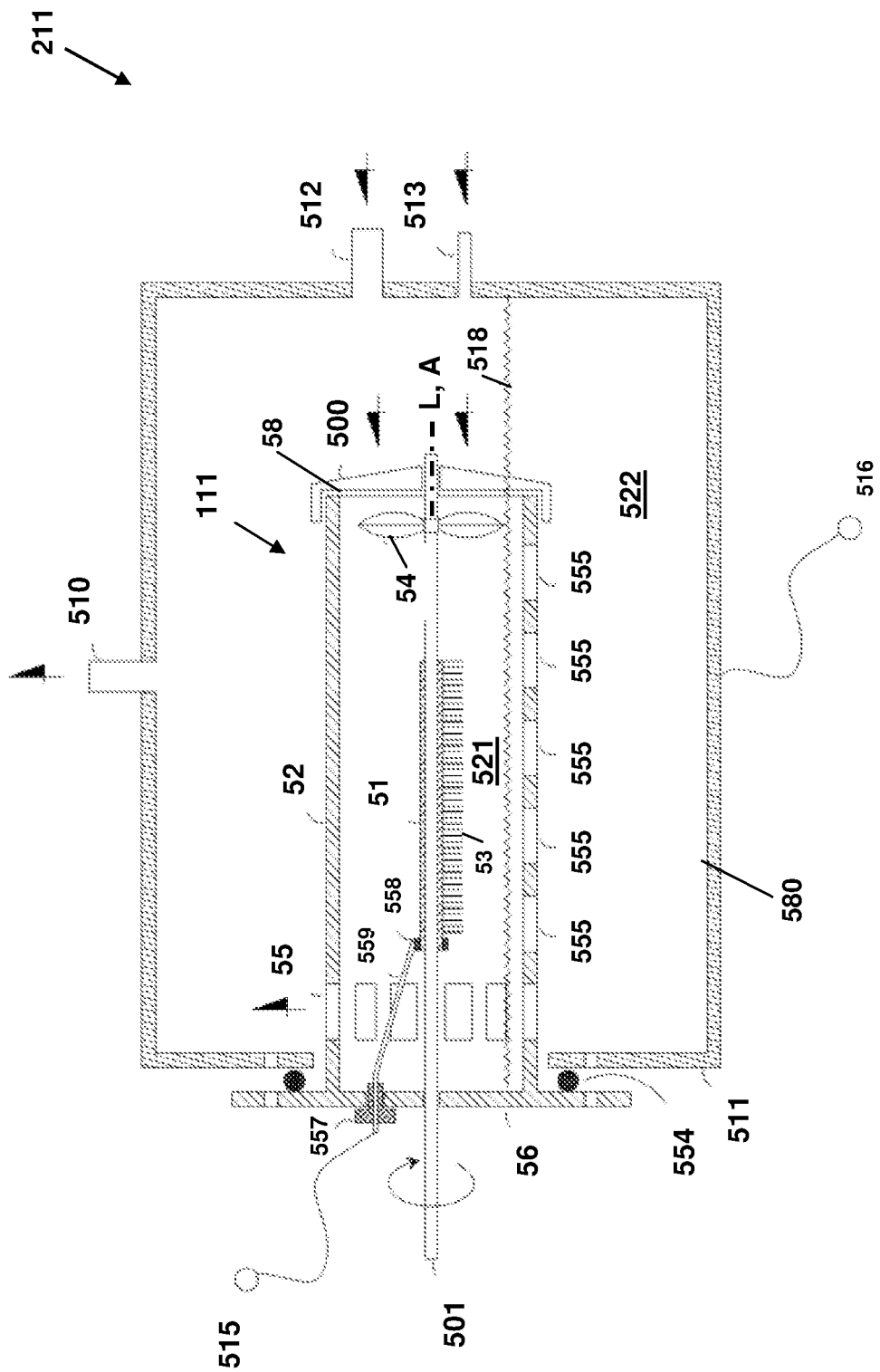
FIG. 5 shows a schematic view in longitudinal section of a reactor incorporating a cold plasma generator device according to a second embodiment of the present invention, which reactor is represented in a first operating mode.
Figure 9:
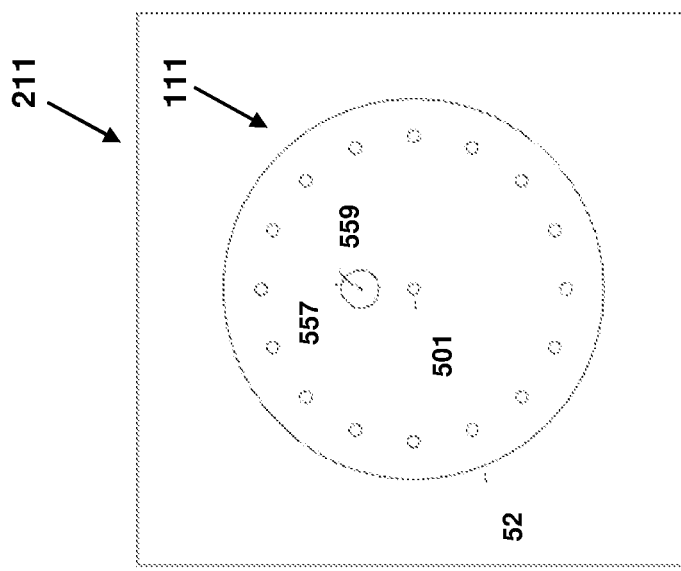
FIG. 9 shows a schematic front view of the reactor of FIG. 5.

By now referring to FIGS. 5 and 9, a cold plasma generator device according to another preferred embodiment of the invention is designated as a whole with 111.

Even the device 111 is suitable to be used in the process chemical industry, in particular in a chemical plant for producing nitric or sulphuric acid.

The device 111 comprises an electrode 51, which in the present example is integral to a revolving shaft 501, preferably at an intermediate region of the latter. The electrode 51 and the shaft 501 have a longitudinal axis L and preferably cylindrical geometry. The electrode 51 for example can be implemented with tubular shape, as shown in FIG. 5, or obtained from a lathe-machined solid cylindrical bar. In the latter case, it can be interposed between longitudinally adjacent portions of the shaft 501.

The electrode 51 is rotatable—integrally to the shaft 501—around an axis of rotation A, which in the present example coincides with the longitudinal axis L. The rotation can be indifferently right-handed or left-handed.

The rotating shaft 501 for example can be made of electric insulating material, such as plastics or ceramics. The choice of the plastic material depends upon the reactions which are wanted to be triggered, by the process temperatures, by the value of the applied electric voltage and by the requested mechanical resistance.

Still in the present example, a main body 52 is provided, arranged outside the electrode 51 and, in the represented variant, coaxially to the electrode 51 itself.

Preferably, the main body 52 has a longitudinal axis thereof coincident with the longitudinal axis L of the electrode 51 itself. The electrode 51 and the main body 52 then result to be substantially centred along such common longitudinal axis L.

The main body 52 has a substantially tubular structure, preferably a cylindrical geometry.

Preferably, the components 51 and 52 are made of metal. The choice of the specific metallic material depends upon the reactions which are wanted to be triggered.

In the present example, the longitudinal axis L is arranged substantially horizontal.

Preferably, the length of the electrode 51 is shorter than the length of the main body 52 and up to half of the same.

In a preferred configuration, the useful (inner) cross section area of the main body 52 is about 25 to 100 times greater than the cross section area of the electrode 51. In particular, since in the present example the electrode 51 and the main body 52 have both circular or substantially circular cross section, the (maximum) diameter of the electrode 51 and the (minimum) diameter of the body 52 preferably are in a ration comprised between about 1/10 and about 1/5.

Preferably, the diameter of the electrode 51 is comprised in a range of about 20-200 mm.

Preferably, the electrode 51 and/or the main body 52 have a length starting from 200 mm and up to few meters.

In general, as it will be understood based upon the following description, the specific sizes of the components 51 and 52 and the related proportions depend upon the power of the generator device 111 and by the features of the flow of gas to be treated.

Preferably, the main body 52 is closed on the top by a flange-like element 56, allowing the passage of the shaft 501 and which is electrically insulating. In the embodiment variant shown in FIG. 5, the flange-like element 56 is an integrating portion of the main body 52.

In order to allow the rotation of the shaft 501, the closing element 56 can have, at its own seat allowing the passage of the shaft 501 itself, one or more bearings or a bushing made of a special polymer with very low friction coefficient.

The device 111 further comprises means for triggering means a discharge between the electrode 51 and a second electrode thereabout it will be spoken later. Such triggering means is arranged at a plasma generation region 521, described later too.

In the present example, the triggering means is integral to the rotating electrode 51. Still in the present example, the triggering means is based upon the point effect and comprises in particular a substantially comb-shaped element 53.

Preferably, the comb-shaped element 53 is made of metallic material. The choice of the specific metallic material depends upon the reactions which are wanted to be triggered. The comb-shaped element 53 can be wholly analogous to the one already described with reference to FIG. 1 and therefore it will not further be illustrated.

The device 111 further comprises gas intaking means, in particular air, within the plasma generation region 521. In the present example, such intaking means comprises a rotor or impeller 54, revolving integrally with the electrode 51 and mounted thereon or on the shaft 501 upstream of the flow of gas with respect to the region 521. The impeller 54 then, in the present example, is an axial impeller. The impeller 54 is arranged near a gas inlet 58 thereabout it will be spoken shortly.

The impeller 54 can be made of plastic or metallic material, indifferently. The choice of the plastic/metallic material depends upon the reactions which are wanted to be triggered and by the process temperatures.

The features of the impeller, even depending upon the sizes with respect to the main body 52, can be the same already illustrated for the impeller 4 of FIG. 1 related to the herein considered outer electrode 2.

The main body 52 has the already mentioned gas inlet 58, in particular arranged at its own base, upstream of the plasma generation region 521 with respect to the gas flow as adducted indeed as inlet from the impeller 54. The gas inlet 58 defines the sucking section of the impeller 54.

At the gas inlet 58 a spoke-like support 500 is placed, to house a bearing for centering the shaft 501.

The main body 52 has also a plurality of gas outlet ports, designated with 55, for the recirculation of the plasma gas which has crossed la plasma generation region 521.

Preferably, the ports 55 are arranged at a side wall, the side skirt in the present example, of the body 52. The ports 55 are arranged downstream of the plasma generation region 521 still with respect to the flow of inlet gas, so that therethrough a portion of the plasma gas, which has formed in such region 521, outgoes.

Still based upon a preferred embodiment, the gas outlet area defined by the recirculation ports 55 is substantially equal to or greater than the useful (inner) cross section area of the main body 52.

Preferably, each one of the recirculation ports 55 has a substantially circular or rectangular profile.

The main body 52 furthermore has liquid inlet ports 555, suitable to allow a partial immersion of the main body 52 itself, and in particular of the side skirt thereof, within a conductive liquid 522. In particular, the ports 555 allow the conductive liquid to penetrate the space comprised between main body 52 and electrode 51.

In the shown specific embodiment, the liquid inlet ports 555 and the recirculation ports 55 are arranged in substantially orthogonal position the ones with respect to the other ones on respective portions of the main body 52.

Embodiment variants can provide a single recirculation port 55 and/or a single liquid inlet port 555.

The device 111 comprises then a sliding electric contact 558 associated to the electrode 51 and suitable to connect the latter, for example by means of a stem or conductive wire 559 and an insulating sleeve 557 passing through the closing element 56, to an electric source with high voltage or frequency. A terminal-pole of the latter is designated, by way of example, with 515.

The generator device 111 is shown as part of a reactor 211.

The reactor 211 has an external casing 511 preferably with substantially cylindrical or parallelepiped geometry. The generator device 111 is at least partially received within the casing 511 of the reactor 211.

The casing 511 defines a tank region 580, which, in use, receives the already mentioned conductive liquid 522, preferably water. The free surface of the latter is designated with 518.

Between the casing 511 and the closing flange 56 of the device 111 a gasket 554 can be interposed.

In the present example, the casing 511 is arranged substantially aligned to the electrode 51 and to the main body 52 along the axis L of the device 111, and in particular substantially horizontal. The electrode 51 then results to be substantially parallel to the free surface 518 of the conductive liquid 522.

At the casing 511, and in particular at its tank region 580, an inlet 513 for the liquid and an inlet 512 for gas, typically air, are obtained. In the herein considered arrangement, the air inlet 512 of the reactor 211 is obtained on the same side of the liquid inlet 513, preferably at a base of the casing 511.

Preferably, automatic or manual means for adjusting the conductive liquid level in the tank region 580 is provided.

The casing 511 then, at its own side skirt and in particular an upper portion of the latter, provides an outlet 510 for the plasma gas useful in the implemented chemical process.

The quantity of plasma gas outgoing from the port 510 with respect to the one recirculated through the ports 55 is linked to the overpressure generating within the device 111 and the reactor 211.

Even the device 111 can be provided as portion of an assembly which also comprises an electric source and in case a driving motor of the electrode 51, in a wholly analogous way to what already described with reference to the first embodiment and related variants.

The above-described generator device 111 at first can work like the generator device 101 or 102 of preceding FIGS. 1 to 4. In such case, the main body 52 acts as outer electrode and the electrode 51 as inner electrode.

Based upon a highly preferred configuration, alternative to that just mentioned and shown in FIG. 5, the device 111 works by using as second triggering electrode—that is additional electrode with respect to the rotating electrode 51—a liquid electrode indeed defined by the conductive liquid 522 received in the casing 511 of the reactor 211. As already said and as shown, in use the free surface 518 of the liquid electrode 522 is faced onto the rotating electrode 51 within the main body 52 and in particular at the plasma generation region 521.

In such configuration, the casing 511 is made of conductive material and connected, together with the rotating electrode 51, to the electric source with high voltage or frequency identified with terminals 515 and 516, suitable to put the electrodes with different voltages. In this way, such voltage transfers from the casing 511 to the liquid electrode 522.

Thanks to the described arrangement, between the electrodes 51 and 522 an electric field is generated which ionizes and excites the particles of gas existing or passing in the plasma generation region 521, allowing to obtain, as outlet from the region 521, a plasma gas.

The typical operating modes of the reactor 211 and of the generator device 111 incorporated therein are illustrated hereinafter.

Firstly the chamber of the reactor is filled-up with the conductive liquid, which can be water or other, until a level so as to flood partially the main body 52 and however without ever coming in contact with the comb-shaped element 53 or with the impeller 54.

In this way it is guaranteed that the filling liquid, apart from reaction liquid, becomes even the power supply conductor which implements the second electrode 522.

The above-mentioned level is kept constant by inserting new liquid and preferably controlled and adjusted with suitable means, known on itself.

The management of the liquid level can be particularly important for generating the triggering discharge, since the distance between this level/liquid electrode and the teeth of the comb-shaped element 53 are fundamental for generating the discharge for different applied values of voltage and frequency.

In the same way, under dynamic conditions, after having triggered the discharge and started the plasma in the generation region 521, it could be necessary increasing the distance between the comb-shaped element 53 and the liquid electrode 522 and this could be done, for example, by adjusting the liquid level.

After having inserted the conductive liquid within the reactor 221, with the already mentioned outer motor—or with equivalent driving means—and with suitable transmissions with high electric insulation, the first electrode 51 is made to rotate with angular speed from few revolutions per minute up to 2800 revolutions per minute. The rotation speed depends upon the generator size and upon the applied voltages and frequencies.

By supplying high voltage and/or high frequency to the electrodes 51 and 522, in the space comprised between the points of the comb-shaped element 53 and the second electrode 522, that is in the plasma generation region 521, a discharge is triggered, in particular a discharge visible thanks to the proximity between the two conductive portions and to the point effect.

The rotation of the first electrode 51 moves continuously the triggering area, by distributing it uniformly over the whole cylindrical surface of the electrodes 51 and 522 and the toric area of the region 521 as defined even by the not immersed side skirt of the main body 52.

After the triggering discharge, between the first electrode 51 and the second electrode 522 a plasma cylindrical region is created, which can involve even the whole length of the main body 52.

The rotation of the first electrode 51 carries therewith the impeller 54 sucking gas and vapours from the inlet 58 and makes them to cross the plasma cylindrical region which has created, outgoing from the recirculation ports 55.

In this way a continuous recirculation of the reaction gases/vapours in the plasma area is guaranteed. The heat generated by the electric art will make to increase the temperatures of the recycled gases and vapours, but the continuous contact with the liquid free surface implements the condition of an adiabatic thermal exchange, so that the heat is absorbed by generation of new vapour. In this way, by managing suitably the process parameters two favourable conditions are implemented, that is formation of vapour which is more reactive chemically and which is continuously recirculated in the region 521, keeping the inner temperature of the reactor 211 at values equal to the liquid evaporation temperature.

Under dynamic conditions, through the gas inlet 512 the reaction gases are inserted, as well as through the liquid inlet 513 the reaction liquid is inserted continuously.

The equilibrium between the rate of the plasma gas outgoing from the reactor 211 through the port 510 and the rate of the gases recirculated through the ports 55 depends upon the specific operating needs and influences the overall performance of the process. Preferably, such rates are in a ratio which can vary in a range of about 1:1 and up to 1:10.

Figure 6:
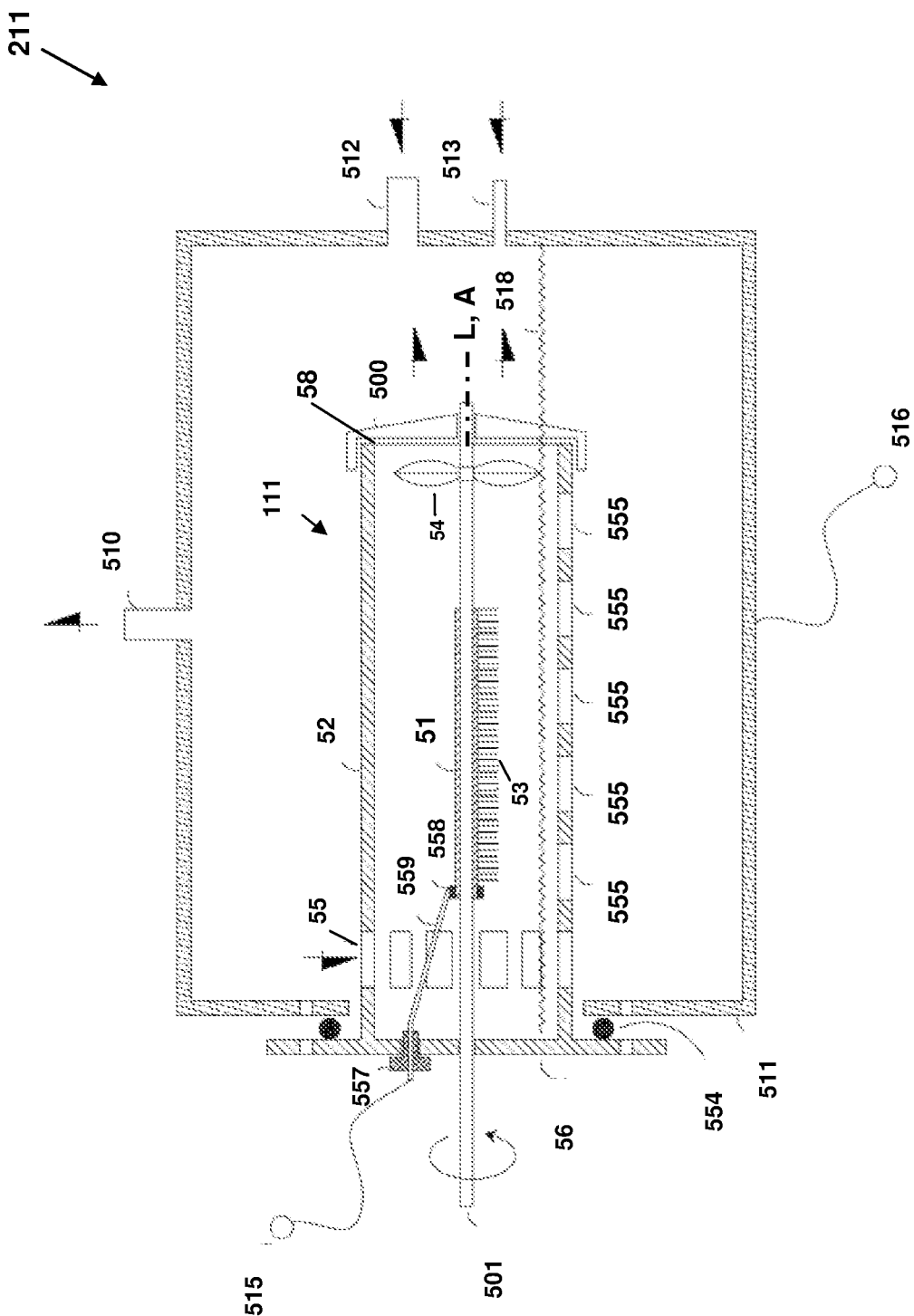
FIG. 6 shows a schematic view in longitudinal section of the reactor of FIG. 5, represented in a second operating mode.

FIG. 6 relates to a second operating mode of the reactor 211 and of the device 111. In such second mode, the rotation direction of the first electrode 51 is inverted with respect to that of FIG. 5. This determines an inversion of the role of the gas inlet and outlet ports 58 and 55 of the device itself. In particular, the flows of the gases/vapours inside the plasma region 521 result to be inverted: the gas which has to cross the region 521 is inserted by the port(s) 55 and outgoes under the form of plasma gas from the port 58.

Figure 7:
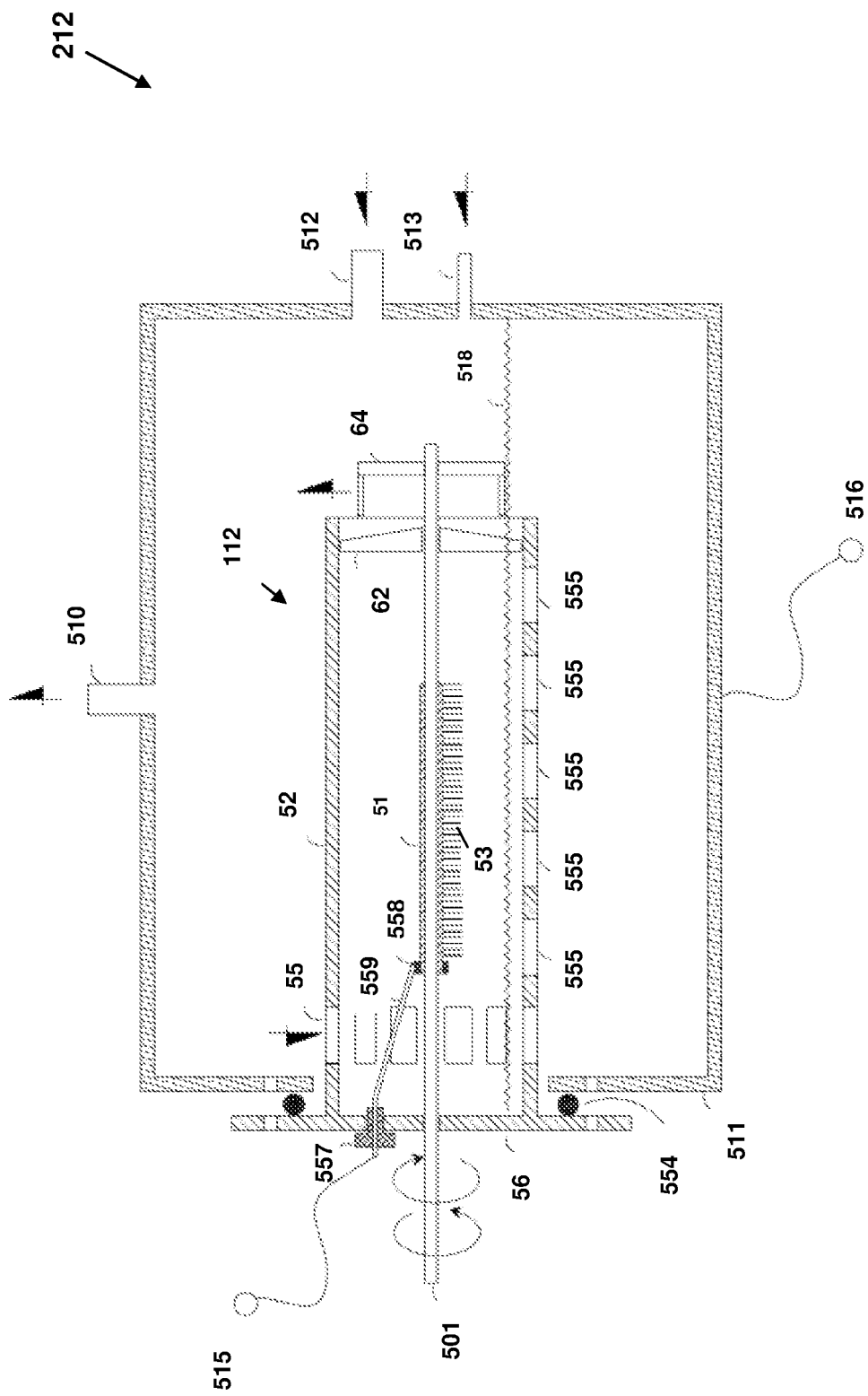
FIG. 7 shows a schematic view in longitudinal section of a reactor incorporating a first embodiment variant of the device of FIG. 5.

FIG. 7 shows a different embodiment of the generator device, herein designated as a whole with 112 and inserted in a reactor 212.

With respect to the embodiment of FIG. 5, in this case the impeller is shown under the form of a centrifugal impeller 64. A centering bracket 62 for the shaft 501 is further provided.

The advantage of having a centrifugal fan is to be able to have available greater total pressure to force the gases/vapours to cross the plasma region 521 and to keep constant the direction of these flows, independently from the fact if the shaft is in a right-handed or left-handed rotation.

Figure 8:
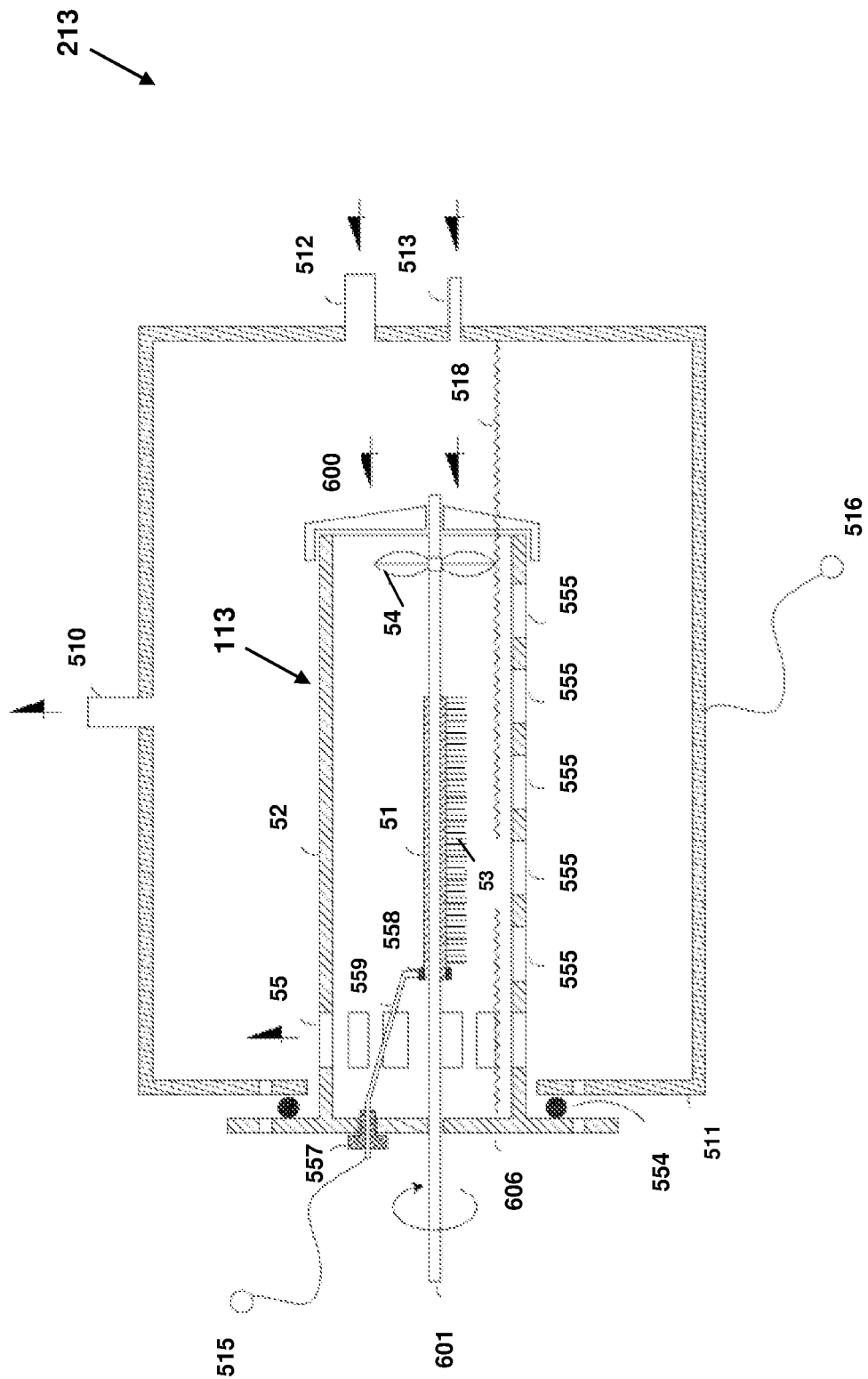
FIG. 8 shows a schematic view in longitudinal section of a reactor incorporating a second embodiment variant of the device of FIG. 5.

FIG. 8 shows an additional embodiment of the generator device, herein designated as a whole with 113 and inserted in a reactor 213.

In this case the rotating shaft, herein designated with 601, with all elements fixed thereto, is placed in a no longer concentric, but eccentric position with respect to the main body 52. This positioning can be useful for example when, for technical reasons, it is necessary guaranteeing a more efficient arc turn-off.

In this asset the distance between the teeth of the comb-shaped element 53 and the main body 52 is not constant, varying from a minimum when the combs are faced perpendicularly to the liquid electrode 522, until a maximum when the comb-shaped element 53 is 180° from the minimum distance.

With respect to the preceding figures with coaxial shaft, the maximum distance which is implemented is greater than the maximum distance with respect to the described preceding embodiments.

Figure 10:
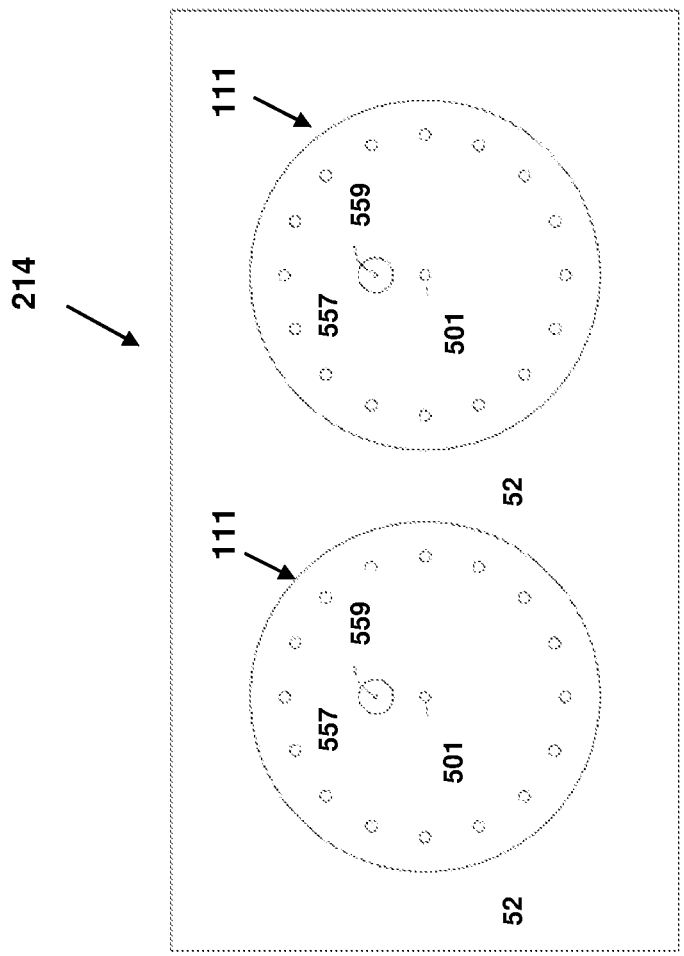
FIG. 10 shows a schematic front view of a reactor incorporating a pair of generator devices each one implemented according to the embodiment of FIG. 5.

FIG. 10 shows a different embodiment of reactor, designated with 214, which comprises a plurality, in particular a pair, of generator devices 111.

Figure 8A:
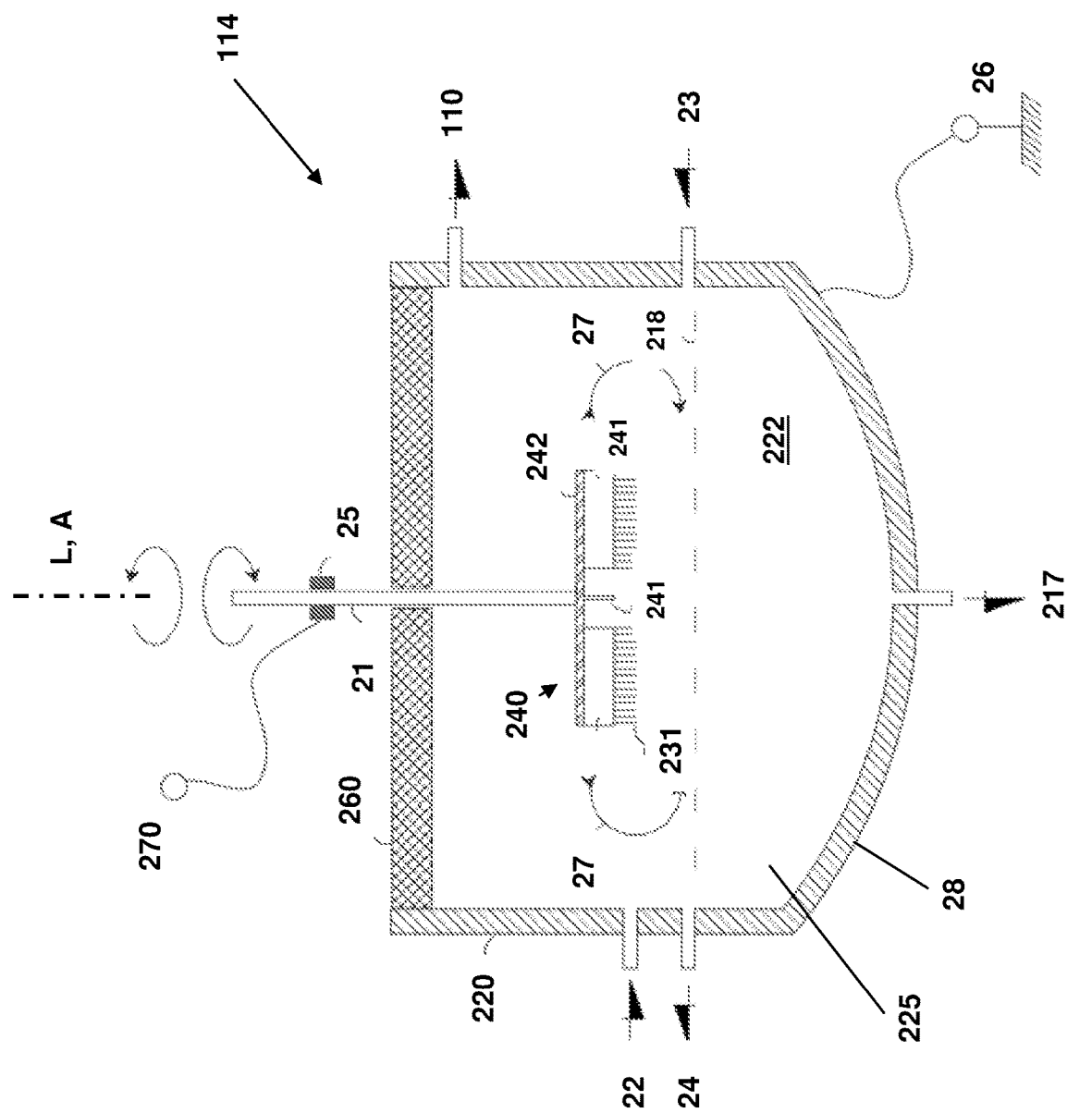
FIG. 8A shows a schematic view in longitudinal section of a cold plasma generator device or reactor according to a third embodiment of the present invention.
Figure 8B:
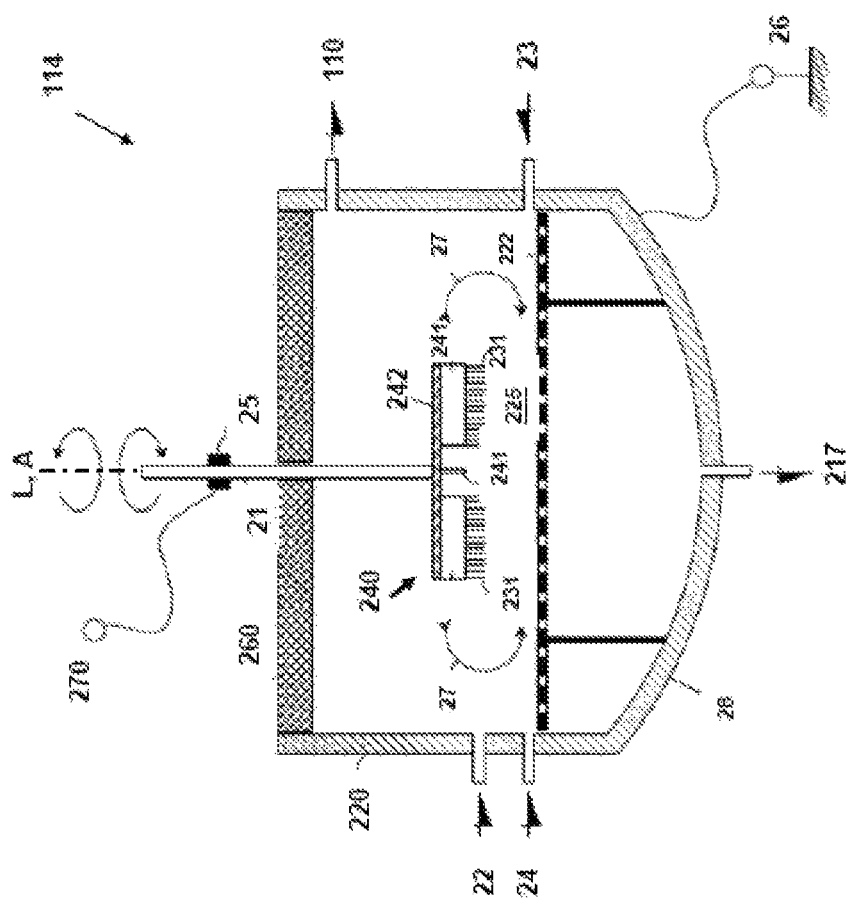
FIG. 8B shows a schematic view in longitudinal section of a cold plasma generator device or reactor according to an additional embodiment of the present invention.

FIG. 8A shows a third preferred embodiment of a cold plasma generator device according to the invention, herein designated as a whole with 114. Even the generator device 114, similarly to the devices shown in FIGS. 5 to 8, is of the kind which can use a liquid electrode, herein designated with 222.

Even the device 114 is suitable to be used in the process chemical industry, in particular in a chemical plant for producing nitric or sulphuric acid.

The device 114 comprises a substantially shaft-shaped electrode 21. The electrode 21 has a longitudinal axis L and preferably cylindrical geometry. The electrode 21 for example can be implemented with tubular shape, or obtained from a lathe-machined solid cylindrical bar.

The electrode 21 is rotatable around an axis or rotation A, which in the present example coincides with the longitudinal axis L. The rotation can be indifferently right-handed or left-handed.

The device 114 has an external casing 220 defining a tank region 28, which receives, in use, a conductive liquid 222, preferably water. The free surface of the latter is designated with 218. Preferably, the casing 220 has an upper portion with substantially cylindrical geometry and a lower portion, corresponding to the region 28, substantially shaped like a basin or bulb.

At the casing 220, and in particular at the tank region thereof 28, an inlet 23 for the liquid and an outlet 24, still for the liquid, are obtained. Preferably, such inlet and outlet 23 and 24 are arranged at the side skirt of the casing 220, preferably on opposite sides thereof.

Furthermore, a lower liquid outlet 217 is provided, to empty the device 114 at the end of operation or for maintenance.

Preferably, automatic or manual means for adjusting the level of conductive liquid in the tank region 28 is provided.

The casing 220 has further an inlet 22 for the gas. In the herein considered arrangement, the gas inlet 22 is obtained on opposite side with respect to the liquid inlet 23, still at the side skirt of the casing 220.

In the herein considered arrangement, the device 114 has a plasma gas outlet 110 arranged on the casing 220, preferably on opposite side with respect to the gas inlet 22.

Still in the present example, the casing 220 and the electrode 21 are arranged substantially coaxial along the axis L, which axis in the present example is vertical or substantially vertical. The electrode 1 then results to be substantially orthogonal to the free surface 218 of the conductive liquid.

The electrode 21 and the casing 220 result to be substantially centered along such common longitudinal axis L.

In the considered example, an upper closing element 260 for the casing 220, substantially analogous to the closing element 6 already described with reference to the generator device 101 of FIG. 1 is provided. In order to allow the rotation of the electrode 21, the closing element 260, at its own seat allowing the passage of the electrode 21 itself, can have one or more bearings or bushings made of special polymer with very low friction coefficient.

Preferably, the diameter of the electrode 21 is comprised in a range of about 20-200 mm, depending upon the generator power and by the flow of the gas to be treated.

Preferably, the electrode 21 and/or the casing 220 have a length starting from 200 mm and up to few meters, depending upon the power of the generator and upon the flow of the material to be treated.

Preferably, the electrode 21 and the casing 220 are made of metal. The choice of the specific metallic material depends upon the reactions which are wanted to be triggered.

The device 114 further comprises means for triggering a discharge between the electrode 21 and the liquid electrode 222. Such triggering means is arranged at a plasma generation region 225.

In the present example, the triggering means is integral to the rotating electrode 21. Still in the present example, the triggering means is based upon the point effect and in particular comprises a substantially comb-shaped element 231.

Preferably, the comb-shaped element 231 is made of metallic material. The choice of the specific metallic material depends upon the reactions which are wanted to be triggered. The comb-shaped element 231 can be wholly analogous to the one already described with reference to the preceding embodiments and therefore it will be not further illustrated.

The device 114 further comprises means for intaking gas within the plasma generation region 225. In the present example, such intaking means comprises a rotor or impeller 240, rotating integrally to the electrode 21 and mounted thereon. In the present embodiment the impeller 240 is of radial type and comprises a plurality of blades 241, preferably made of metallic material, integral, in particular welded, to a closing disc 242. The blades 241 can be in number of four to sixteen, depending upon the size and the aeralic parameters which are wanted to be obtained.

The closing disc 242 can be made of metallic material too, with diameter preferably of 200 mm and up to few meters or more.

The choice of the material of the impeller depends upon the reactions which are wanted to be triggered and by the process temperatures.

The teeth of the comb-shaped element 231 preferably are directly integral, for example welded, to the blades of the impeller 240.

The reference 27 designates the lines of flow of the gases moved by the radial impeller 240.

The device 114 then comprises a sliding electric contact 25 associated to the electrode 21 and suitable to connect the latter to an electric source with high voltage or frequency. A terminal-pole of the latter is designated, by way of example, with 270.

Even the device 114 can be provided as a portion of an assembly which comprises even an electric source and in case a driving motor of the electrode 21, in a wholly analogous way to what already described with reference to the first embodiment and related variants.

The above-described generator device 114 at first can work like the generator device 101 or 102 of the preceding FIGS. 1 to 4. In such case, the casing 220 acts as outer electrode and the electrode 21 as inner electrode.

Based upon a highly preferred configuration, alternative to the one just mentioned and shown in FIG. 8A, the device 114 works by using as second triggering electrode—that is additional electrode with respect to the rotating electrode 21—the already mentioned liquid electrode indeed defined by the conductive liquid 222.

In this configuration, the casing 220 is made of conductive material and connected, together with the rotating electrode 21, to the electric source with high voltage or frequency identified with the already mentioned terminal 270 and with another terminal 26, suitable to put the electrodes at different voltages. In this way, such voltage is transferred from the casing 220 to the liquid electrode 222.

Thanks to the described arrangement, between the electrodes 21 and 222 an electric field is generated which ionizes and excites the particles of gas existing or passing in the plasma generation region 225, allowing to obtain, outletting from the region 225, a plasma gas.

As far as the operation of the device 114 is concerned, the casing 220 is filled up with deionised water or other liquid through the inlet 23 and up to the level 218. This level is kept constant with continuous liquid charging with suitable pump managed by level sensors inside the device or the reactor wherein it is inserted. A possible liquid excess is discharged by the overflow port 217.

With an outer motor and suitable transmissions with high electric insulation, the electrode 21 is put into rotation with angular speed from few revolutions per minute and up to about 2800 revolutions per minute. The rotation speed depends upon the generator size and upon the applied voltages and frequencies.

By supplying high voltage or high frequency or both of them to the electrodes, in the space comprised between the points of comb 231 and the surface of the liquid contained in the reactor, a discharge is triggered visible thanks to the proximity between the two portions and thanks to the "point" effect.

The rotation of the central electrode 21 moves continuously the triggering area, by distributing it uniformly over the whole circular surface below the radial impeller.

The rotation of the impeller 240, due to the centrifugal effect, sucks gases and vapours from the bottom and it pushes them in the radial direction. In this way the gases and vapours contained in the device volume are continuously recycled and forced to cross the cold plasma region, with toroidal configuration, as shown by the flow lines 27.

The sofar described generator system designated as a whole with 14 can be seen not only like a generator device, but also like a complete reactor.

The cold plasma generators and reactors can operate both with atmospherical pressure and with medium or high pressure, therefore with absolute pressure values which can vary from 1 and up to 5 MPa. The operation values depend upon the type of reaction which is wanted to continue, upon the elements entering in the reaction and at last upon the process economy which is wanted to be implemented.

The cold plasma generators can work with voltages starting from few kVolt and up to several hundreds of kVolt. The choice of the working voltage depends upon the distance between the electrodes, upon the dielectric product pressing between the electrodes and by the type of reaction which is wanted to be developed. The frequency of the power supply system can vary from 0 Hz and up to few tera Hz. Therefore, from direct current up to laser frequency. Even this choice depends upon the distance between the electrodes, upon the dielectric product pressing between the electrodes and upon the type of reaction which is wanted to be developed, apart from the process economy.

FIG. 8A shows an additional preferred embodiment of a cold plasma generator device according to the invention, herein designated as a whole with 114.

The generator system designated as a whole with 114 which will be described hereinafter can be seen not only like a generator device, but also like a complete reactor.

Even the device 114 is suitable to be used in the process chemical industry and/or in processes wherein an advanced oxidizing state of the substances inserted at the gaseous and/or vapour state, in particular in a chemical plant for producing nitric or sulphuric acid or other substances as already exemplified above, is requested.

The device 114 comprises a substantially shaft-shaped electrode 21. The electrode 21 has a longitudinal axis L and preferably cylindrical geometry. The electrode 21 for example can be implemented with tubular shape, or obtained from a lathe-machined solid cylindrical bar.

The electrode 21 is rotatable around an axis of rotation A, which in the present example coincides with the longitudinal axis L. The rotation can be indifferently right-handed or left-handed.

The device 114 has an external casing 220. Preferably, the casing 220 has a side portion, or skirt, with substantially cylindrical geometry and a lower portion 28 substantially shaped like a basin or bulb.

The casing 220 has further three inlets 22, 23 and 24 for the aeriform reagent like gas and/or vapour. In the herein considered arrangement, the gas inlets 22, 23 and 24 are obtained at the side skirt of the casing 220, in particular two on one side and the third at the opposite side. Even in this case, a different number of inlets, even only one, can be provided.

Furthermore, a lower liquid outlet 217 can be provided, for the reasons already illustrated above. The outlet 217 in this example is arranged at the portion 28.

In the herein considered arrangement, the device 114 has a plasma gas outlet 110, and in general for the aeriform reaction products, arranged on the casing 220, preferably on opposite side with respect to the inlets 22 and 24.

Still in the present example, the casing 220 and the electrode 21 are arranged substantially coaxial along the axis L, which axis in the present example is vertical or substantially vertical. The electrode 1 then results to be substantially orthogonal to the lower portion of the device 114.

The electrode 21 and the casing 220 result to be substantially centered along such common longitudinal axis L.

In the considered example, an upper closing element 260 for the casing 220 is provided, substantially analogous to the closing element 6 already described with reference to the generator device 101 of FIG. 1. In order to allow the rotation of the electrode 21, the closing element 260, at its own seat allowing the passage of the electrode 21 itself, can have one or more bearings or a bushing made of a special polymer with very low friction coefficient.

Preferably, the diameter of the electrode 21 is comprised in a range of about 20-200 mm, depending upon the generator power and by the flow of gas to be treated.

Preferably, the electrode 21 and/or the casing 220 have a length starting from 200 mm and up to few meters, depending upon the generator power and upon the flow of material to be treated.

Preferably, the electrode 21 is made of metal. The choice of the specific metallic material depends upon the reactions which are wanted to be triggered.

The device 114 comprises then a counter-electrode 222 substantially shaped like a grid or a holed plate, arranged substantially horizontal in the herein considered example. In the present example, the electrode 222 is in electric contact with the casing 220 for example by means of metallic legs. In the present arrangement the holed plate is positioned below said inlets of the aeriform reagent 22, 23 and 24. The perforation of the electrode 222 allows the liquid outflow toward the outlet 217.

The device 114 further comprises means for triggering a discharge between the electrode 21 and the electrode 222. Such triggering means is arranged at a plasma generation region 225.

In the present example, the triggering means is integral to the rotating electrode 21. Still in the present example, the triggering means is based upon the point effect and comprises in particular a substantially comb-shaped element 231.

Preferably, the comb-shaped element 231 is made of metallic material. The choice of the specific metallic material depends upon the reactions which are wanted to be triggered. The comb-shaped element 231 can be wholly analogous to the one already described with reference to the preceding embodiments and it will not be further illustrated.

The device 114 further comprises means for intaking aeriform reagent into the plasma generation region 225. In the present example, such intaking means comprises a rotor or impeller 240, revolving integrally to the electrode 21 and mounted thereon. In the present embodiment the impeller 240 is of radial type and it comprises a plurality of blades 241, preferably made of metallic material, integral, in particular welded, to a closing disc 242. The blades 241 can be in number of four to sixteen, according to the size and the aeraulic parameters which are wanted to be obtained.

The closing disc 242, too, can be made of metallic material, with diameter preferably of 200 mm and up to few meters or more.

The choice of the material of the impeller depends upon the reactions which are wanted to be triggered and by the process temperatures.

The teeth of the comb-shaped element 231 preferably are directly integral, for example welded, to the blades of the impeller 240.

The reference 27 designates the lines of flow of the gases and/or vapours moved by the radial impeller 240.

The device 114 comprises then a sliding electric contact 25 associated to the electrode 21 and suitable to connect the latter to an electric source with high voltage or frequency. A terminal-pole of the latter is designated, by way of example, with 270. The other terminal is designated with 26 and puts the casing 220 and the counter-electrode 222 at the same potential. Therefore, even the casing 220 will be preferably made of conductive, in particular metallic, material.

Even the device 114 can be provided as portion of an assembly which comprises also an electric source and in case a driving motor of the electrode 21, in a wholly analogous way to what already described with reference to the first embodiment and related variants.

The above-described generator device 114 can work like the generator devices of the preceding figures.

In particular, with an outer motor and suitable transmissions with high electric insulation, the electrode 21 is made to rotate with angular speed from few revolutions per minute and up to about 2800 revolutions per minute. The rotation speed depends upon the generator size and upon the applied voltages and frequencies.

By supplying high voltage or high frequency or both of them to the electrodes, in the space comprised between the points of comb 231 and the electrode 222 a discharge is triggered visible thanks to the proximity between the two portions and thanks to the proximity between the two portions and thanks to the "point" effect.

Thanks to the described arrangement, between the electrodes 21 and 222 an electric field is generated which ionizes and excites the particles of gas or vapour existing or passing in the plasma generation region 225, allowing to obtain, outletting from the region 225, a plasma gas.

The rotation of the central electrode 21 moves continuously the triggering area, by distributing it uniformly over the whole surface of the counter-electrode 222.

The rotation of the impeller 240, due to the centrifugal effect, sucks gas and vapours from the bottom and pushes them in the radial direction. In this way, the gases and vapours contained in the volume of the device are continuously recycled and forced to cross the cold plasma region, with toroidal configuration, as shown by the flow lines 27.

The cold plasma generator devices and the related reactors according to the above-described embodiments and variants are conceived, as already said, to be used in the process chemical industry, in particular in a chemical plant for producing nitric or sulphuric acid.

FIGS. 11 to 15 refer, each one, to an embodiment of a plant for producing nitric acid and to a related method or process.

Figure 11:
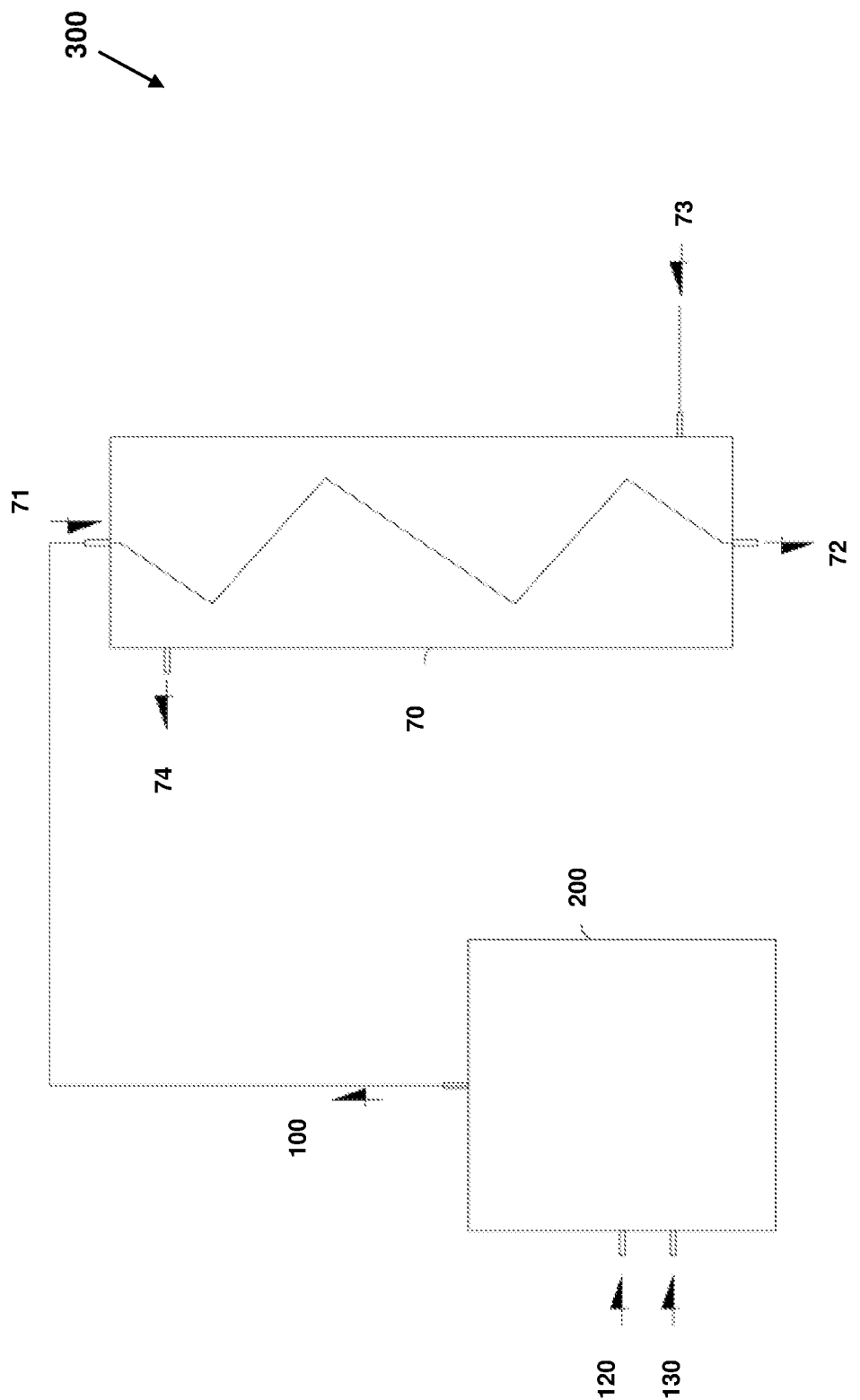
FIG. 11 shows a schematic block representation of a first embodiment of a chemical plant or apparatus incorporating a cold plasma generator device and/or a related reactor according to anyone of the preceding figures.

By firstly referring to FIG. 11, a plant 300 for producing nitric acid comprises a reactor according to anyone of the above-described embodiments and variants, designated in general with 200. The outlets of such reactor 200 designated with 130 and 120 respectively refer to an inlet of conductive liquid, in particular deionised water, and to an inlet of air under standard conditions or air enriched with oxygen, in the latter casa obtained, for example, with separators with molecular sieves or other technology known on itself.

The outlet 100, instead, relates to vapour of nitric acid+ nitrogen oxides+exceeding nitrogen+water vapour, as outlet from the reactor 200. Such outlet from the reactor is adducted in a condenser 70 cooling acid vapours, preferably wholly made of metallic material. The choice of the specific metallic material depends upon the vapour which as to be condensed.

The condenser 70 has an inlet 71 of the above-mentioned vapours and gases, an outlet 72 of condensed acid+water+ exceeding gas, an inlet 73 of the liquid or cooling gas—for example water or air—and an outlet 74 of the liquid or cooling gas.

Into the reactor 200 atmospheric air is inserted, under standard ambient conditions, properly filtered or air enriched with oxygen by molecular sieves or other system through the inlet 120, with flow proportioned to the inner recirculation factor of the reactor 200, which as said can vary from a ratio Air/Recirculation 1:1 and up to 1:10.

Still into the reactor 200 deionised water is inserted through the inlet 130 and kept at level with suitable pumps and sensors, not described as known on themselves.

Once having started the cold plasma generators as described above, in the reactor 200 the following reaction develops:

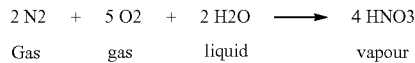

The reaction takes place with formation of vapour of nitric acid outgoing from the outlet 100 of the reactor 200, together with the nitrogen excess usually contained in the atmospheric air as well as a water vapour, oxygen and not reacted nitrogen oxides.

This flow of acid vapour, nitrogen, oxygen, water vapour and nitrogen oxides enters the condenser 70 through the inlet 71 and outgoes cooled down and condensed from the bottom, from the outlet 72, still together with the nitrogen excess, oxygen and not reacted or not condensed oxides. Therefore, the nitric acid is collected in diluted by the outlet 72, together with the exceeding gas mixture.

The liquid or cooling gas for the process requirements circulates from the inlet 73 and outlet 74 of the condenser 70.

Figure 12:
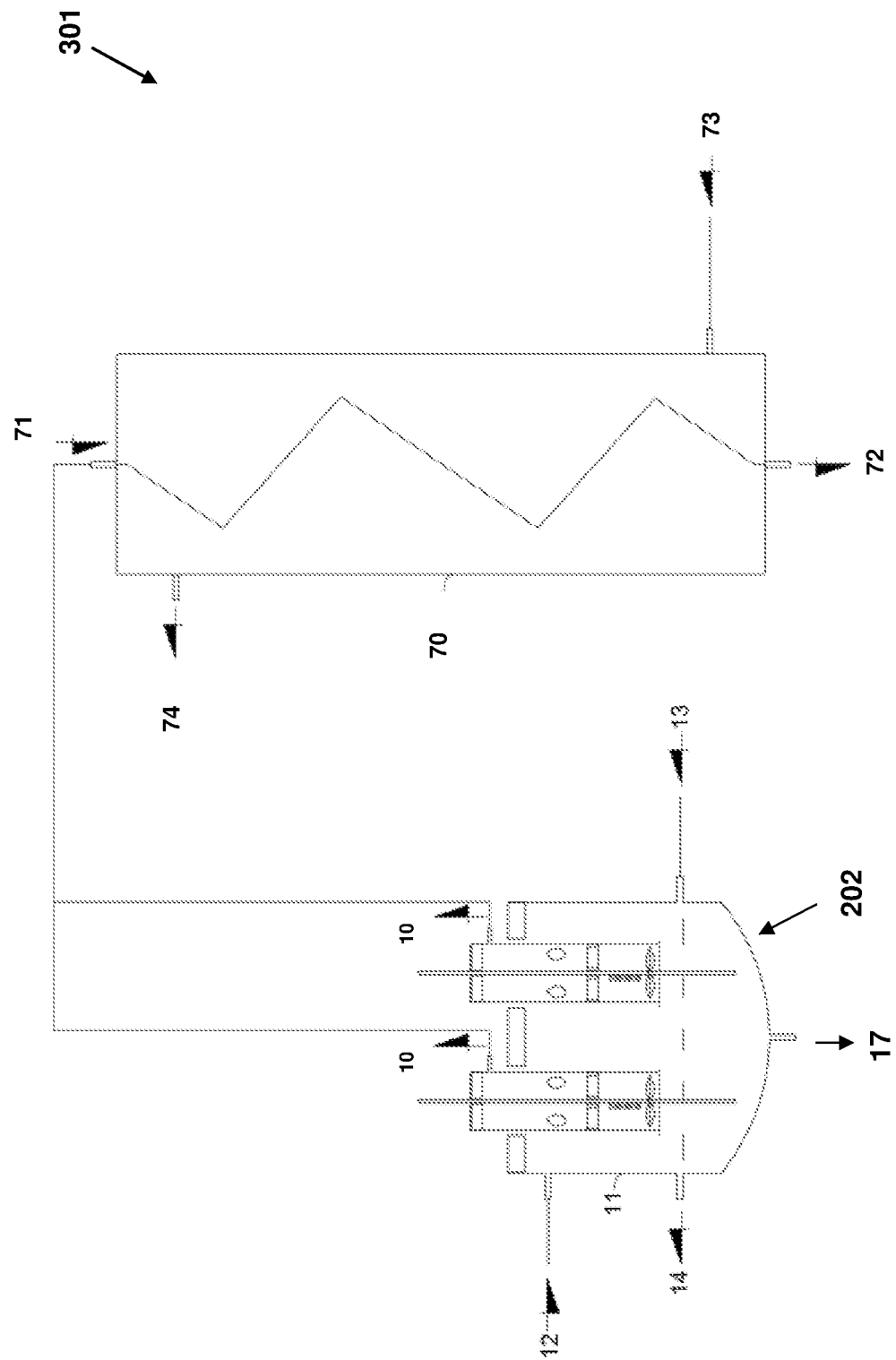
FIG. 12 shows the plant of FIG. 11 in the variant incorporating the reactor of FIG. 4.

FIG. 12 shows a detail of the just-described plant 300, herein designated with 301, to be used with the reactor 202 of FIG. 4.

Figure 13:
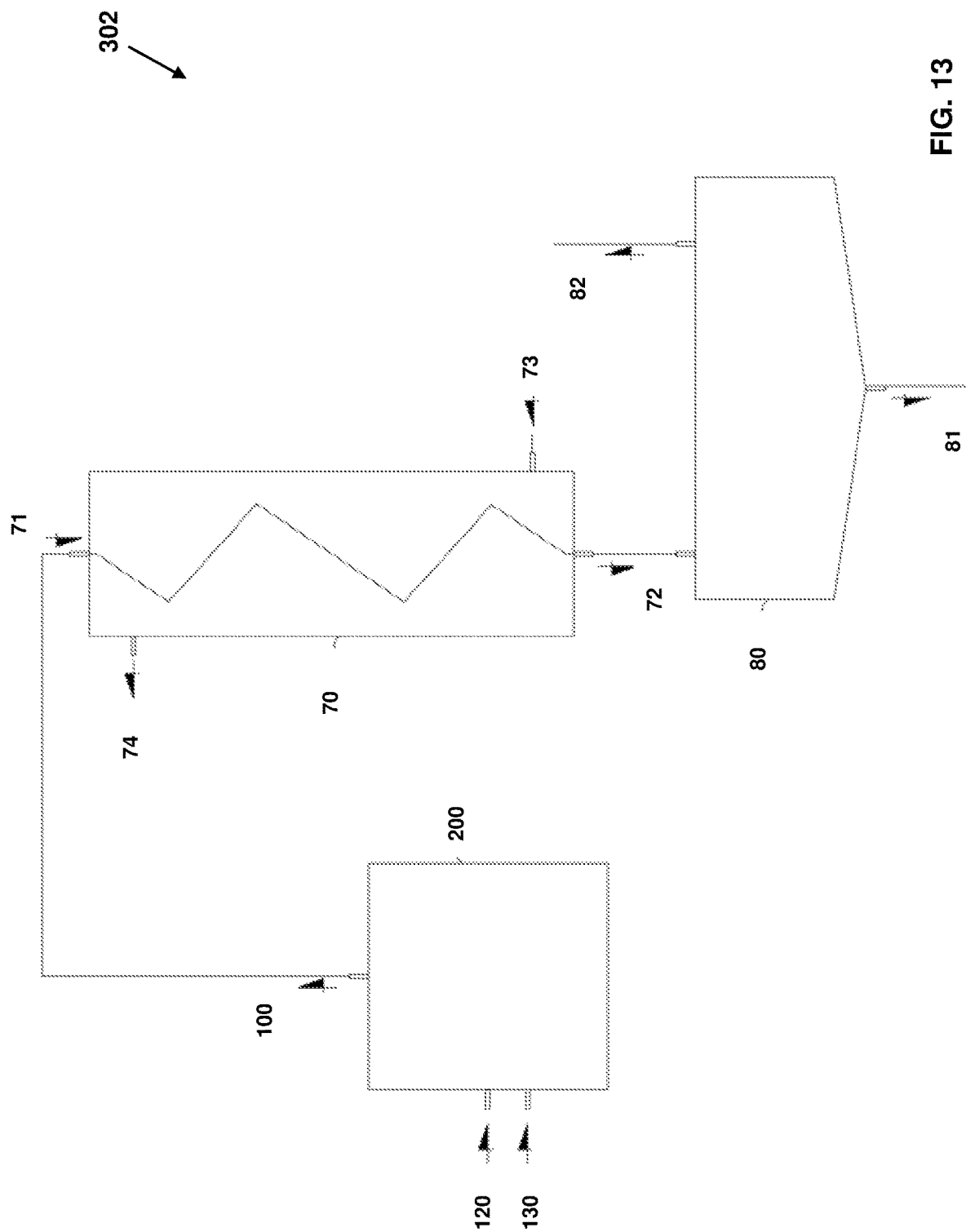
FIG. 13 shows a schematic block representation of a second embodiment of a chemical plant or apparatus incorporating a cold plasma generator device and/or a related reactor according to anyone of FIGS. 1 to 10.

FIG. 13 shows a second embodiment of a plant for producing di nitric acid, in this case designated as a whole with 302.

The plant 302 comprises, apart from the components already described for the plant 300, a liquid-gas atmospheric separator 80, arranged downstream of the condenser 70.

The condensed product and the gases coming from the condenser 70 are indeed inserted into the separator 80. The latter can be under the form of a simple tank wherein the gases set free from the condensate and outgo from the outlet 82, whereas the condensed product is collected onto the bottom and outgoes from the outlet 81.

Figure 14:
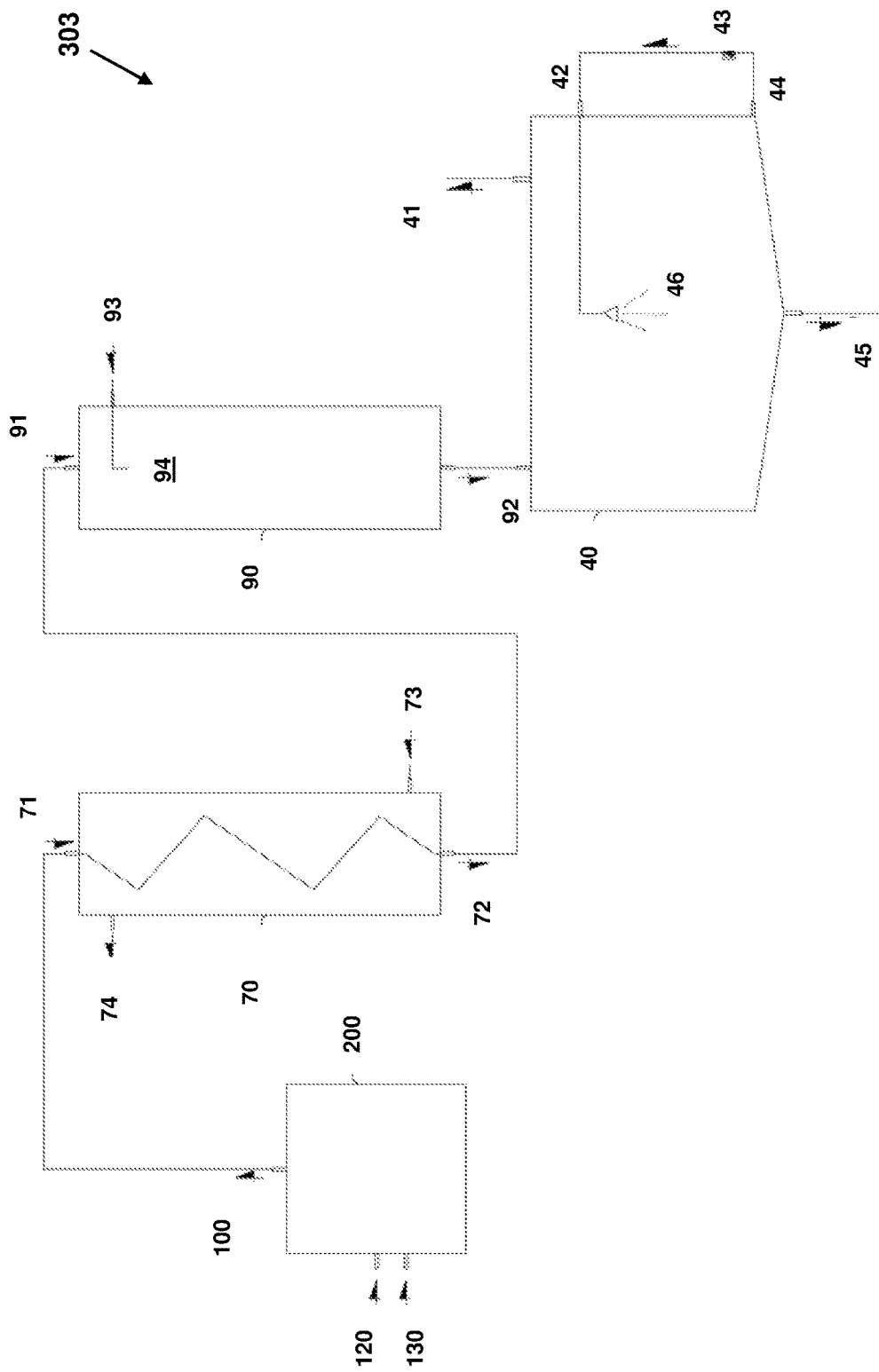
FIG. 14 shows a schematic block representation of a third embodiment of a chemical plant or apparatus incorporating a cold plasma generator device and/or a related reactor according to anyone of FIGS. 1 to 10.

FIG. 14 shows a third embodiment of plant for producing nitric acid, in this case designated as a whole with 303.

The plant 303 comprises, apart from the components already described for the the plant 300, a fog reactor 90 and a contact reactor 40.

In particular, the condensed product+the gases coming from the condenser 70 are sent to the inlet 91 of a reactor 90 wherein a fog is generated constituted by very fine small drops of still deionised water. The deionised water is inserted in the due quantities through the inlet 93 and finely pulverised by a set of spray nozzles 94. The mixture of condensate and gases inserted into the fog reactor 90 is subjected to an additional cooling due to adiabatic effect.

Embodiment variants can provide an alternative cooling and/or condensing device to the herein considered fog reactor.

Through an outlet 92 of the fog reactor 90, the condensed product and the gases pass in the contact reactor 40, which is sized for a residence time of several minutes and up to few hours. During the stay in the contact reactor 40 the condensed product which is collected onto the bottom is continuously recycled thanks to a set of pumps 43 sucking from the lower portion through an outlet 44 and which re-enters it in the high portion of the reactor 40 through an inlet 42.

The condensed product is pulverised in the reactor 40 through a set of nozzles 46, in very fine small drops and so as to increase enormously the liquid-gas interface surface. The recirculation ratio can vary from 1 and up to 20 times the rate of the condensed product entering from the fog reactor.

This recirculation allows a strict and more prolonged contact between the residual gases existing at the inlet and the condensed diluted acid, with formation of additional acid by reaction between the water and the nitrogen oxides and the oxygen not reacted in the preceding steps, thus increasing the final concentration of the acid which is collected onto the bottom of the reactor 40 and which is discharged through a lower outlet 45.

The exceeding gases and the not reacted gases are discharged through an upper outlet 41.

Figure 15:
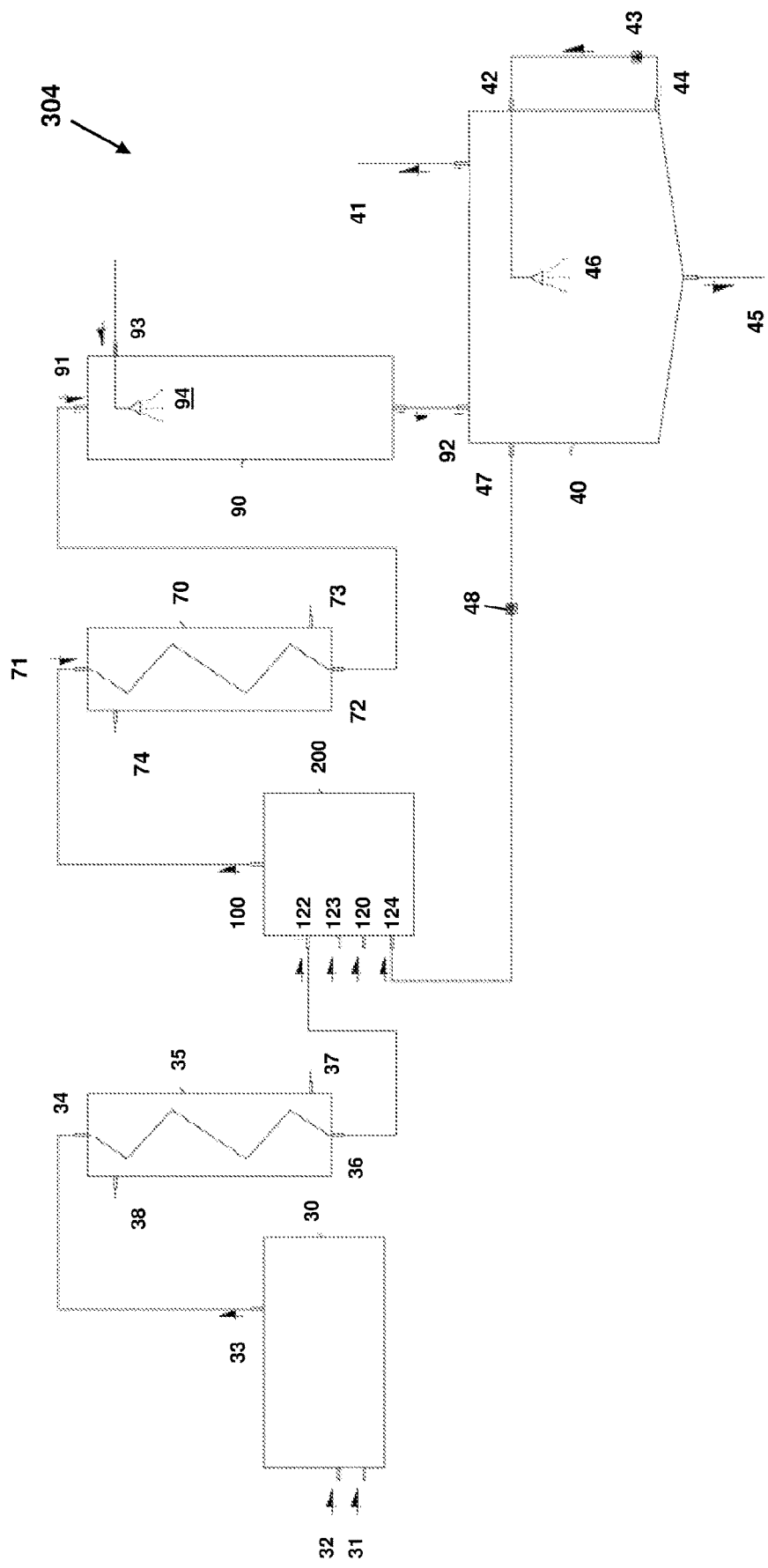
FIG. 15 shows a schematic block representation of a fifth embodiment of a chemical plant or apparatus incorporating a cold plasma generator device and/or a related reactor according to anyone of FIGS. 1 to 10.

FIG. 15 shows a preferred embodiment of a plant for producing sulphuric acid, in this case designated as a whole with 304.

The plant 304 comprises one or more sulphur burners 30, preferably wholly made of metallic material. The choice of the specific metallic material depends upon the chemical resistance to the vapours of sulphur oxides.

The burners 30 provide an oxygen inlet 31 and a liquid or solid sulphur inlet 32. In the latter case, the inlet 32 can be shaped as a hopper.

At the outlet 33 from the burners 30 fumes of sulphur oxides are obtained. The latter are adducted to an inlet 34 of one or more coolers-recuperators 35.

The latter are coolers-recuperators of sulphur acid vapours with production of water vapour or overheated air, preferably wholly made of metallic material. The choice of the specific metallic material depends upon the chemical resistance to the vapours of sulphur oxides.

At an outlet 36 from the cooler(s)-recuperator(s) 35 cooled fumes are obtained.

The cooler(s)-recuperator(s) 35 further provide an inlet 37 of water or cooling air and an outlet 38 of water vapour or overheated air, which can be subjected even to other uses.

Downstream of the cooler(s)-recuperator(s) 35 one or more reactors of the already described type are provided, even in this case designated with 200 and having an inlet 120 of deionised water or other conductive liquid. An inlet 122 for the fumes, an inlet 123 of secondary oxygen and an inlet 124 of oxides and oxygen not reacted and recirculated in the reactors 200 are further provided on the reactor 200. At outlet 100, vapours of sulphuric acid+oxides and not reacted oxygen.

In case of implementation in metal, even in this case the choice of the metallic material of such reactors depends upon the chemical resistance to the sulphur acid vapours.

Downstream of the reactor 200 a condenser cooler of acid vapours 70 of the already described type is provided. Even in this case several condensers, instead of only one, can be provided.

At the inlet 71 of the condenser 70 vapours of not reacted sulphuric acid+oxides and oxygen enter and at the outlet 72 not reacted condensed sulphuric acid+oxides and oxygen.

Downstream of the condenser 70 one fog reactor (or several fog reactors) 90 of the already described type is provided, at the inlet 91 thereof not reacted condensate sulphuric acid+oxides and oxygen are adducted and at the outlet 92 of not reacted condensed sulphuric acid+oxides and oxygen and water fog.

The latter are adducted into one or more contact reactors 40 of the already described type.

At the lower outlet 45 liquid sulphuric acid is obtained. Not reacted oxides and oxygen outgo from the upper outlet 41.

In this case, an outlet 47 is provided for sucking not reacted oxides and oxygen from the contact reactor 40 for the recirculation in the reactor 200. Then, there is a fan or blower or compressor or equivalent means 48 for the recirculation.

The sulphur, under the liquid or solid form, is burnt in the burner 30 with inletting of oxygen in almost stoichiometric proportions for the formation of Sulphur Dioxide SO2, according to the following reaction:

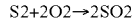

$$S2+2O2 \rightarrow 2SO2$$

The required oxygen is produced locally with suitable molecular sieves or other technique. The combustion fumes, constituted by SO2, enter the cooler-recuperator 2 in order to be brought up to a temperature of about 70-100° C.

The heat recovered by the cooler-recuperator 35 can be used to produce vapour or overheated air to be used in other portion to produce electric energy or mechanical driving force, however necessary to the process.

The cooled-down fumes of SO2 enter the plasma reactor 200. Even deionised water and additional oxygen enter the reactor 200, in order to obtain the following final formation reaction:

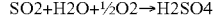

$$SO2+H2O+\tfrac{1}{2}O2 \rightarrow H2SO4$$

In the reactor 200 the fumes, the oxygen and the not reacted water fog coming from the contact reactor 40 are also recirculated.

Vapours of sulphuric acid+sulphur oxide, oxygen and water vapour not reacted at temperature higher than 100° C. outgo from the reactor 200 and then they go to a second condenser 70, wherein they are cooled down with water or air to bring them at temperature of about 50-70° C.

Condensed acid+sulphur oxide and oxygen outgo from the condenser 74 which go to the fog reactor 90, wherein a small additional quantity of deionised water, and finely pulverised by means of a set of spray nozzles 94, is inserted.

The mixture of condensed product and gases inserted into the fog reactor 90 is subjected to a second cooling due to the adiabatic effect.

after the fog reactor, the condensed product and the gases pass into the contact reactor 40, which is sized for a residence time of several minutes and up to few hours.

During the permanence in the contact reactor the condensed product which is collected onto the bottom is continuously recycled thanks to a set of pumps 43 sucking on the lower side through the outlet 44 and it re-enters it on the upper side of the reactor 40 through the inlet 42.

The condensed product is pulverised in the reactor by means of the set of nozzles 46 in very fine small drops and so as to increase enormously the liquid-gas interface surface.

The recirculation ratio can vary from 1 and up to 20 times the rated of the condensed product entering from the fog reactor 90.

This recirculation allows a strict and more prolonged contact between the residual gases existing at the inlet and the condensed diluted acid, with formation of additional acid by reaction between the water and the sulphur oxides and the oxygen not reacted in the preceding steps, thus increasing the final concentration of the acid collected by the lower outlet 45.

The exceeding gases and the not reacted gases are discharged through the upper outlet 41.

All inlets, outlets and the ports mentioned above with reference to the generator devices, reactors and plants can be under the form of ducts, blocks or other.

Additional subject of the present invention is a chemical process for producing an acid by means of cold plasma, preferably nitric or sulphuric acid.

The cold plasma can be generated with a generator device 101, 102 according to anyone of the herein described embodiments, preferably comprised in an reactor apparatus 201, 202 according to anyone of the herein described embodiments.

According to an embodiment in the process of the present invention a generator device is used, comprising an outer electrode 2 and an inner electrode 1 arranged so that the outer electrode 2 surrounds the inner electrode 1 and so as to define therebetween a plasma generation region 121. The inner 1 and/or outer 2 electrodes are fed by a power source 15, 16 so that a difference in electric potential is established therebetween at the plasma generation region 121. The electrodes rotate one with respect to the other one, preferably the inner electrode 1 is rotatable and the outer electrode 2 is fixed.

The outer 2 and inner 1 electrodes of the generator could be arranged so that the respective longitudinal axes L are substantially parallel or coincident and the common direction of said axes preferably corresponds also to that of an axis A of relative rotation. The outer 2 and inner 1 electrodes for example can be arranged coaxially or eccentrically with a longitudinal axis L of the inner electrode 1 substantially vertical.

According to an embodiment, in the process a generator is used, whose second electrode is a liquid electrode 522, preferably in this embodiment the generator device 111, 112, 113 will be arranged so that a longitudinal axis L of the first electrode 51 is substantially parallel to the free surface 18 of the liquid electrode 522. A main body 52, as described above, could be further provided, which encloses the first electrode 51 and at least partially immersed in the liquid electrode 522. The liquid electrode 522 preferably will be used to cool down the gas entering the plasma generation region 521 by generating a vapour entering the plasma generation region 521. Advantageously in this embodiment the distance between the first 51 and second 522 electrode could be adjusted by controlling the level of the liquid electrode 522.

According to a preferred embodiment, the electrodes of the generator device 101, 102 of the chemical process could be guided at a maximum rotation speed of about 2800 revolutions per minute, for example by using the above-described driving means.

In the chemical process of the present invention a gas is inserted through the plasma generation region 121 described above so as to obtain a plasma gas.

According to an embodiment of the chemical process of the present invention, a portion of the plasma gas which has crossed the plasma generation region 121 is recirculated in the region itself.

Preferably the portion of the recirculation plasma gas is in a ratio comprised in a range 1:10 up to 10:1 with respect to the plasma gas which leaves the generator device or the acid which leaves the reactor apparatus towards further steps of the process. The recirculation could take place, for example, by means of the recirculation outlet doors described above and arranged in the reactor apparatus as illustrated above.

The chemical process of the present invention could comprise an additional step of condensing the acid and gas/vapour generated in the reactor apparatus, for example by using a condenser 70 according to anyone of the above-described embodiments and in case a liquid-gas separation step downstream of said condensing step. In such liquid-gas separation step a liquid-gas atmospherical separator 80 could be used arranged as described above. The chemical process could further comprise at least an additional cooling step downstream of the condensing step, preferably said additional cooling step could take place in a fog reactor 90 according to the anyone of the above-described embodiments.

The chemical process could further provide a further reaction step apt to increase the acid production downstream of said condensing step and preferably downstream of the cooling step. The increase in the acid production could be obtained by providing, for example, an increase in the contact surface between condensed acid and vapours in a contact reactor 40 according to anyone of the above-described embodiments.

According to an advantageous embodiment, the chemical process of the present invention is used to produce $H_2SO_4$, for example according to the present reaction:

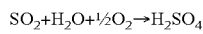

$$SO_2 + H_2O + \tfrac{1}{2}O_2 \rightarrow H_2SO_4$$

The process could provide a step for producing sulphur fumes, for example in a sulphur burner, apt to produce sulphur fumes and arranged upstream of the reactor apparatus wherein the reaction for forming the sulphuric acid takes place. The sulphur fumes, before their inletting in the plasma generation region 121, can be subjected to a cooling step in a cooling device as described above and then inserted into the reactor apparatus according to anyone of the above-described embodiments. The oxygen necessary to the reaction for example could be produced locally with suitable molecular sieves or other technique.

According to another preferred embodiment, the chemical process of the present invention is used to produce $HNO_3$, by inserting atmospherical air in a reactor apparatus according to anyone of the herein described embodiments, in such reactor nitric acid will be formed according to the following reaction:

$$2N_2 + 5O_2 + 2H_2O \rightarrow HNO_3$$

The chemical process subject of the present invention preferably will be performed in a plant according to anyone of the above-described embodiments.

The generator device, the reactor apparatus and the plant of the invention could be used for producing any chemical substance, intermediate products included, according to the specific inlet substances.

The invention can be applied in all process technologies related to the use of atmospherical cold plasma, for producing compounds such as nitric acid, sulphuric acid, calcium nitrate, ammonium sulphate, ammonium nitrate, NO, NO2, NOx, and so on, as well as any other chemical process which could be developed with this technology.

The present invention has been sofar described with reference to preferred embodiments. It is to be meant that other embodiments may exist, belonging to the same inventive core, as defined by the protection scope of the herebelow reported claims.

The invention claimed is:

1. A generator device of cold plasma for use in a process for producing any of an acid, nitric acid, sulphuric acid, ammonium nitrate, ammonium sulphate, calcium nitrate, NO, $NO_2$, NOR, NxOx or oxidized VOCs, the device comprises:
    a first electrode and a second electrode, arranged so as to define between them a plasma generation region, which first and/or second electrode are connected or connectable to a power source so that, in use, a difference in electric potential is established at said plasma generation region;
    an inlet port for a gas which has to cross said plasma generation region for generating a plasma gas, at least a recirculation outlet port for recirculating the plasma gas which has crossed said plasma generation region, and an outlet port for outletting the plasma gas, wherein the outlet port is arranged downstream of the at least one recirculation outlet port with respect to flow of the plasma gas; and
    a main body, said first electrode being at least partially received within said main body, wherein said inlet port and/or said at least a recirculating outlet port are obtained on said main body, and said inlet port or said at least a recirculating outlet port is arranged at an end of said main body, and wherein said main body has a plurality of recirculation outlet ports for the plasma gas, wherein the inlet port and the at least one recirculation outlet port are arranged orthogonal to each other;
    wherein the device is configured so that said second electrode is a liquid electrode and the first electrode is rotatable.

2. The generator device according to claim 1, wherein said main body and said first electrode are arranged so that respective longitudinal axes (L) are substantially parallel or coincident.

3. The generator device according to claim 1, wherein the cross-section area of said main body is about 25 to 100 times greater than the cross section of said first electrode, and wherein the diameter of said main body is about 5 to 10 times greater than the diameter of said first electrode.

4. The generator device according to claim 1, further comprising a gas intaker, apt to draw gas through the plasma generation region, wherein said gas intaker comprises a rotor or impeller.

5. The generator device according to claim 4, wherein said gas intaker comprises the rotor or impeller arranged outside said main body.

6. The generator device according to claim 4, wherein said gas intaker comprises the rotor or impeller which has a diameter comprised in a range of about 70-95% of an internal diameter of said main body.

7. The generator device according to claim 1, further comprising a trigger for triggering a discharge between said first and second electrode.

8. A generator assembly, comprising:
the generator device according to claim 1;
high frequency or tension electric generator of connected or connectable to said first and/or second electrode of said generator device; and
a motor apt to drive in rotation one of said electrodes of said generator device.

9. A reactor apparatus suitable for use in a process for producing an acid, nitric acid, sulphuric acid, ammonium sulphate calcium nitrate, NO, $NO_2$, $NO_x$, $N_xO_x$ or oxidized VOCs, which apparatus comprises at least a generator device according to claim 1, and further comprising the outlet port for outputting a gas/vapour obtained in said reactor apparatus by a reaction involving the plasma gas generated in said at least a generator device.

10. The reactor apparatus according to claim 9, which apparatus has a tank region apt to receive the liquid electrode of said generator device.

11. The reactor apparatus according to claim 9, further comprising an external casing, said generator device being at least partially arranged inside said casing.

12. The reactor apparatus according to claim 11, wherein said casing has a conductive liquid inlet, a gas inlet and a gas/vapour outlet.

13. The reactor apparatus according to claim 9, wherein said generator device is arranged so that a longitudinal axis (L) of said first electrode is substantially horizontal.

14. A chemical plant comprising:
the generator device according to claim 1; and
a condenser to receive as an input the gases/vapours outputted from said generator device.

15. The chemical plant according to claim 14, further comprising a liquid-gas separator arranged downstream of said condenser.

16. The chemical plant according to claim 14, further comprising a cooling device arranged downstream of said condenser and a contact reactor arranged downstream of said condenser.

17. The chemical plant according to claim 16, wherein said contact reactor comprises recirculator of the condensed product.

18. The chemical plant according to claim 16, further comprising a connector between said contact reactor and said generator device apt to adduct a gas from the contact reactor in the generator device.

19. The chemical plant according to claim 14. further comprising a sulphur burner apt to produce sulphur fumes and arranged upstream of said generator device, and a cooling device arranged downstream of said burner(s) and upstream of said generator device, wherein the plant produces nitric or sulphuric acid.

* * * * *